United States Patent
Nilsson et al.

(10) Patent No.: US 9,854,274 B2
(45) Date of Patent: *Dec. 26, 2017

(54) VIDEO CODING

(75) Inventors: Mattias Nilsson, Sundbyberg (SE);
Renat Vafin, Tallinn (EE); Soren Vang Andersen, Esch-sur-Alzette (LU)

(73) Assignee: SKYPE LIMITED, Dublin (IE)

( * ) Notice: Subject to any disclaimer, the term of this patent is extended or adjusted under 35 U.S.C. 154(b) by 231 days.

This patent is subject to a terminal disclaimer.

(21) Appl. No.: 13/274,865

(22) Filed: Oct. 17, 2011

(65) Prior Publication Data

US 2013/0058395 A1     Mar. 7, 2013

(30) Foreign Application Priority Data

Sep. 2, 2011   (GB) .................................. 1115210.5

(51) Int. Cl.
*H04N 19/103* (2014.01)
*H04N 19/89* (2014.01)
(Continued)

(52) U.S. Cl.
CPC ........... *H04N 19/89* (2014.11); *H04N 19/107* (2014.11); *H04N 19/147* (2014.11); *H04N 19/166* (2014.11); *H04N 19/176* (2014.11)

(58) Field of Classification Search
CPC ........ H04N 7/26; H04N 19/89; H04N 19/107; H04N 19/166; H04N 19/17; H04N 19/176;
(Continued)

(56) References Cited

U.S. PATENT DOCUMENTS 5,583,963 A   12/1996   Lozach
6,097,897 A    8/2000   Ide
(Continued)

FOREIGN PATENT DOCUMENTS

CN      1759610      4/2006
CN    101162930      4/2008
(Continued)

OTHER PUBLICATIONS

"International Search Report and Written Opinion", Application No. PCT/US2012/053581, (dated Dec. 11, 2012), 14 pages.
(Continued)

*Primary Examiner* — Mohammed Rahaman
*Assistant Examiner* — Kehinde O Abimbola

(57) ABSTRACT

A method of performing a rate-distortion optimization process comprising selecting a preferred encoding mode by optimizing a function comprising an estimate of distortion for a target image portion and a measure of bit rate required to encode that portion. The estimate of distortion is based on source coding distortion and an estimate of error propagation distortion due to loss. The method further comprises transmitting the same encoded version of the video stream from the transmitting terminal to each of a plurality of receiving terminals over respective lossy channels, using the same rate-distortion optimization process in relation to each of the plurality of receiving terminals, making the same encoding mode selection per target image portion based on the same optimization of said function. The estimate of error propagation distortion comprises an aggregate estimate of error propagation distortion that would be experienced due to possible loss over the plurality of channels.

28 Claims, 6 Drawing Sheets

(51) Int. Cl.
*H04N 19/176* (2014.01)
*H04N 19/147* (2014.01)
*H04N 19/107* (2014.01)
*H04N 19/166* (2014.01)

(58) Field of Classification Search
CPC ...... H04N 19/503; H04N 19/61; H04N 19/65; H04N 21/6375
See application file for complete search history.

(56) References Cited

U.S. PATENT DOCUMENTS

| | | | |
|---|---|---|---|
| 6,320,919 B1* | 11/2001 | Khayrallah | H04B 7/0845 375/341 |
| 6,421,387 B1* | 7/2002 | Rhee | H04B 1/66 375/240.12 |
| 6,683,988 B1 | 1/2004 | Fukunaga et al. | |
| 7,093,028 B1* | 8/2006 | Shao et al. | 709/240 |
| 7,142,599 B2 | 11/2006 | Henocq | |
| 7,317,759 B1 | 1/2008 | Turaga et al. | |
| 7,433,661 B2 | 10/2008 | Kogiantis et al. | |
| 7,881,190 B2* | 2/2011 | De Cnodder | H04L 47/10 370/230 |
| 8,180,915 B2 | 5/2012 | Zhao | |
| 8,457,202 B2 | 6/2013 | Wang et al. | |
| 8,634,413 B2 | 1/2014 | Lin et al. | |
| 8,804,836 B2 | 8/2014 | Nilsson et al. | |
| 8,908,761 B2 | 12/2014 | Nilsson et al. | |
| 9,036,699 B2 | 5/2015 | Vafin et al. | |
| 9,131,248 B2 | 9/2015 | Nilsson et al. | |
| 9,143,806 B2 | 9/2015 | Nilsson et al. | |
| 9,307,265 B2 | 4/2016 | Nilsson et al. | |
| 9,338,473 B2 | 5/2016 | Zhao et al. | |
| 2002/0064228 A1 | 5/2002 | Sethuraman et al. | |
| 2003/0012202 A1* | 1/2003 | Fukutomi | 370/395.52 |
| 2003/0048791 A1* | 3/2003 | De Cnodder | H04L 47/10 370/395.42 |
| 2003/0202579 A1 | 10/2003 | Lin et al. | |
| 2004/0071128 A1* | 4/2004 | Jang | H04W 88/04 370/349 |
| 2004/0114817 A1 | 6/2004 | Jayant et al. | |
| 2004/0228537 A1 | 11/2004 | Yeung et al. | |
| 2004/0264571 A1* | 12/2004 | Zhang et al. | 375/240.16 |
| 2005/0053299 A1 | 3/2005 | Fuchs et al. | |
| 2005/0135484 A1 | 6/2005 | Lee et al. | |
| 2005/0213657 A1 | 9/2005 | Kodama et al. | |
| 2005/0237987 A1 | 10/2005 | Wang et al. | |
| 2005/0265383 A1 | 12/2005 | Melpignano et al. | |
| 2006/0056338 A1* | 3/2006 | Abe et al. | 370/328 |
| 2006/0098573 A1* | 5/2006 | Beer | H04L 12/2856 370/230 |
| 2006/0239348 A1 | 10/2006 | Zhang | |
| 2006/0268976 A1 | 11/2006 | Baum et al. | |
| 2006/0291558 A1 | 12/2006 | Schreier | |
| 2007/0030894 A1 | 2/2007 | Tian et al. | |
| 2007/0160137 A1 | 7/2007 | Guo et al. | |
| 2007/0206673 A1 | 9/2007 | Cipolli et al. | |
| 2008/0088743 A1* | 4/2008 | Zhu | H04N 19/147 348/578 |
| 2008/0089414 A1 | 4/2008 | Wang et al. | |
| 2008/0112481 A1 | 5/2008 | Hsaing et al. | |
| 2008/0247469 A1 | 10/2008 | Vadapalli et al. | |
| 2008/0310502 A1 | 12/2008 | Kim et al. | |
| 2008/0316364 A1 | 12/2008 | Au et al. | |
| 2009/0003446 A1 | 1/2009 | Wu et al. | |
| 2009/0003447 A1 | 1/2009 | Christoffersen et al. | |
| 2009/0067495 A1* | 3/2009 | Au et al. | 375/240.12 |
| 2009/0080518 A1 | 3/2009 | Au et al. | |
| 2009/0086816 A1 | 4/2009 | Leontaris et al. | |
| 2009/0086827 A1* | 4/2009 | Wu et al. | 375/240.27 |
| 2009/0103635 A1* | 4/2009 | Pahalawatta | 375/240.27 |
| 2009/0110062 A1 | 4/2009 | Au et al. | |
| 2009/0135901 A1 | 5/2009 | Au et al. | |
| 2009/0190661 A1 | 7/2009 | Nagori | |
| 2009/0219991 A1 | 9/2009 | Po et al. | |
| 2009/0252227 A1 | 10/2009 | Nepomucenoleung et al. | |
| 2010/0161329 A1* | 6/2010 | Chung et al. | 704/242 |
| 2010/0215007 A1* | 8/2010 | Zhang | H04L 5/0007 370/329 |
| 2010/0226262 A1 | 9/2010 | Liu et al. | |
| 2010/0238997 A1 | 9/2010 | Yang et al. | |
| 2010/0239015 A1 | 9/2010 | Wang et al. | |
| 2010/0278055 A1* | 11/2010 | Barry | H04J 3/0682 370/252 |
| 2010/0278275 A1 | 11/2010 | Yang et al. | |
| 2010/0303148 A1 | 12/2010 | Hiron | |
| 2010/0316126 A1 | 12/2010 | Chen et al. | |
| 2011/0080952 A1* | 4/2011 | Vadapalli et al. | 375/240.15 |
| 2011/0090960 A1 | 4/2011 | Leontaris et al. | |
| 2011/0103480 A1 | 5/2011 | Dane | |
| 2011/0119565 A1* | 5/2011 | Chang et al. | 714/776 |
| 2011/0150113 A1 | 6/2011 | Oyman et al. | |
| 2011/0164677 A1 | 7/2011 | Lu et al. | |
| 2011/0182356 A1 | 7/2011 | Ammu | |
| 2011/0206119 A1 | 8/2011 | Bivolarsky et al. | |
| 2011/0286516 A1 | 11/2011 | Lim et al. | |
| 2011/0310766 A1* | 12/2011 | Barry et al. | 370/252 |
| 2011/0310976 A1* | 12/2011 | Wang | H04N 19/176 375/240.24 |
| 2012/0069927 A1 | 3/2012 | Oyman et al. | |
| 2012/0093017 A1* | 4/2012 | Liu et al. | 370/252 |
| 2012/0121013 A1 | 5/2012 | Lainema et al. | |
| 2012/0327997 A1 | 12/2012 | Nilsson | |
| 2012/0327998 A1 | 12/2012 | Nilsson | |
| 2012/0328002 A1 | 12/2012 | Vafin | |
| 2013/0007831 A1 | 1/2013 | Wu et al. | |
| 2013/0044804 A1 | 2/2013 | Nilsson | |
| 2013/0058394 A1 | 3/2013 | Nilsson | |
| 2013/0058405 A1 | 3/2013 | Zhao | |
| 2013/0223513 A1 | 8/2013 | Chen et al. | |
| 2013/0301660 A1* | 11/2013 | Barry et al. | 370/519 |
| 2015/0071353 A1 | 3/2015 | Nilsson et al. | |

FOREIGN PATENT DOCUMENTS

| | | |
|---|---|---|
| CN | 101346999 | 1/2009 |
| CN | 101960466 | 1/2011 |
| EP | 1439712 | 7/2004 |
| EP | 2096874 | 9/2009 |
| EP | 2139138 | 12/2009 |
| EP | 2184925 | 5/2010 |
| EP | 2230849 | 9/2010 |
| GB | 2167267 | 5/1986 |
| GB | 2492329 | 1/2013 |
| JP | H01256818 | 10/1989 |
| JP | 10145794 | 5/1998 |
| JP | H11289542 | 10/1999 |
| JP | 2005354662 | 12/2005 |
| JP | 2006518560 | 8/2006 |
| JP | 2008527936 | 7/2008 |
| JP | 2011517233 | 5/2011 |
| WO | WO-2004004359 | 1/2004 |
| WO | WO-2006042323 | 4/2006 |
| WO | WO-2007015126 | 2/2007 |
| WO | WO-2007084475 | 7/2007 |
| WO | WO-2012171113 | 12/2012 |

OTHER PUBLICATIONS

"International Search Report and Written Opinion", Application No. PCT/US2012/053850, (dated Dec. 5, 2012), 12 pages.
"International Search Report and Written Opinion", Application No. PCT/US2012/053583, (dated Dec. 5, 2012), 13 pages.
"International Search Report and Written Opinion", Application No. PCT/US2012/051507, (dated Dec. 17, 2012), 13 pages.
Alwihaibi, Abdullah et al., "Computation of the Residual Packet Loss Probability in a Binary Multicast Tree", (2003), 4 pages.
Chen, Chih-Ming "Error Resilience Transcoding Using Prioritized Intra-Refresh for Video Multicast Over Wireless Networks", (2005), 4 pages.

(56) References Cited

OTHER PUBLICATIONS

Naghdinezhad, Amir et al., "Distortion Estimation for Reference Frame Modification Methods", *19th European Signal Processing Conference (EUSIPCO 2011)*, (2011), 5 pages.
Stockhammer, Thomas et al., "Rate-Distortion Optimization for JVT/H.26L Video Coding in Packet Loss Environment", *International Workshop on Packet Video*, 2002, (Apr. 24, 2002), 12 pages.
Vadapalli, Sarat C., "Low-Complexity Frame-Level Joint Source-Channel Distortion Optimal, Adaptive Intra Refresh", *2008 IEEE 10th Workshop on Multimedia Signal Processing*, (2008), pp. 474-480.
Vadapalli, Sarat C., et al., "Efficient Alternative to Intra Refresh Using Reliable Reference Frames", *International Conference on Multimedia and Expo, 2007 IEEE*, (2007), 4 pages.
Zhang, Yuan et al., "Joint Source-Channel Rate-Distortion Optimization for H.264 Video Coding Over Error-Prone Networks", (2007), pp. 445-454.
Zhang, Yuan et al., "Optimum End-to-End Distortion Estimation for Error Resilient Video Coding", (2004), 4 pages.
"Final Office Action", U.S. Appl. No. 13/274,881, dated Sep. 16, 2014, 43 pages.
"Foreign Office Action", CN Application No. 201210320553.6, dated Sep. 15, 2014, 16 pages.
"Foreign Office Action", CN Application No. 201210320556.X, dated Nov. 3, 2014, 13 pages.
"Non-Final Office Action", U.S. Appl. No. 13/275,046, dated Dec. 9, 2014, 28 pages.
Girod, et al., "Feedback-Based Error Control for Mobile Video transmission", Proceedings of the IEEE, 87 (10), Oct. 1999, 17 Pages.
Wiegand, et al., "Rate-Distortion Optimized Mode Selection for Very Low Bit Rate Video Coding and the Emerging H.263 Standard", IEEE Transactions on Circuits and Systems for Video Technology, vol. 6, No. 2., Apr. 1996, pp. 182-190.
"Advanced video coding for generic audiovisual services", ITU_T H.264—Series H: Audiovisual and Multimedia Systems Infrastructure of audiovisual services—Coding of moving video, Mar. 2005, pp. 40-41, 70-72.
"Foreign Notice of Allowance", CN Application No. 201210320553.6, dated May 5, 2016, 4 pages.
"Foreign Office Action", JP Application No. 2014-528684, dated May 10, 2016, 10 pages.
"Foreign Office Action", JP Application No. 2014-528685, dated Apr. 26, 2016, 13 pages.
Wei,"Hybrid End-to-end Distortion Estimation and Its Application in Error Resilient Video Coding", ICASSP 2007, Apr. 2007, 5 pages.
Zhang,"Joint Data Partition and Rate-Distortion Optimized Mode Selection for H.264 Error-Resilient Coding", 2006 IEEE Workshop on Multimedia Signal Processing, Oct. 2006, 4 pages.
Zhang,"Video Coding with Optimal Inter/Intra-Mode Switching for Packet Loss Resilience", IEEE Journal on Selected Areas in Communications, vol. 18, No. 6, Jun. 2000, Jun. 2000, 11 pages.
"Search Report", GB Application No. 1115201.4, (dated Feb. 12, 2013), 3 pages.
"Search Report", GB Application No. 1115209.7, (dated Feb. 12, 2013), 3 pages.
"Non-Final Office Action", U.S. Appl. No. 13/274,739, dated Nov. 20, 2013, 14 pages.
"Non-Final Office Action", U.S. Appl. No. 13/274,922, dated Jan. 16, 2014, 18 pages.
"Non-Final Office Action", U.S. Appl. No. 13/275,046, dated Jan. 16, 2014, 21 pages.
"Non-Final Office Action", U.S. Appl. No. 13/274,904, dated Nov. 12, 2013, 25 pages.
"Non-Final Office Action", U.S. Appl. No. 13/274,881, dated Dec. 19, 2013, 29 pages.
"Final Office Action", U.S. Appl. No. 13/274,881, dated Mar. 18, 2014, 32 pages.
"Notice of Allowance", U.S. Appl. No. 13/274,739, dated Jan. 9, 2014, 4 pages.
"Final Office Action", U.S. Appl. No. 13/274,922, dated Jul. 16, 2014, 23 pages.
"Final Office Action", U.S. Appl. No. 13/275,046, dated May 22, 2014, 22 pages.
"Non-Final Office Action", U.S. Appl. No. 13/274,881, dated Jul. 2, 2014, 37 pages.
"Non-Final Office Action", U.S. Appl. No. 13/274,904, dated Jun. 16, 2014, 32 pages.
"Notice of Allowance", U.S. Appl. No. 13/274,803, dated Jul. 30, 2014, 15 pages.
"Foreign Office Action", CN Application No. 20120320325.9, dated Oct. 10, 2014, 18 pages.
"Notice of Allowance", U.S. Appl. No. 13/274,904, dated Dec. 22, 2014, 6 pages.
"Notice of Allowance", U.S. Appl. No. 13/274,922, dated Apr. 13, 2015, 11 pages.
"Non-Final Office Action", U.S. Appl. No. 13/274,881, dated Mar. 6, 2015, 42 pages.
"Notice of Allowance", U.S. Appl. No. 13/275,046, dated May 8, 2015, 7 pages.
Harmanci,"A stochastic framework for rate-distortion optimized video coding over error-prone networks", IEEE Transactions on Image Processing, vol. 16 Issue 3, Mar. 2007, 14 pages.
Stoufs, "Scalable Joint Source-Channel Coding for the Scalable Extension of H.264/AVC", Circuits and Systems for Video Technology, vol. 18 Issue:12, Sep. 16, 2008, 14 pages.
"Final Office Action", U.S. Appl. No. 13/274,881, dated Jul. 15, 2015, 45 pages.
"Foreign Office Action", CN Application No. 201210320325.9, dated Jun. 15, 2015, 7 pages.
"Foreign Office Action", CN Application No. 201210320553.6, dated Jul. 17, 2015, 7 pages.
"Notice of Allowance", U.S. Appl. No. 14/543,057, dated Oct. 22, 2015, 6 pages.
"Foreign Office Action", CN Application No. 201210320556.X, dated Sep. 25, 2015, 7 pages.
"Notice of Allowance", U.S. Appl. No. 13/274,881, dated Jan. 6, 2016, 20 pages.
"Foreign Office Action", CN Application No. 201210320553.6, dated Jan. 25, 2016, 7 pages.
"Foreign Office Action", JP Application No. 2014-528683, dated Apr. 26, 2016, 8 pages.
Chen,"Adaptive Error-Resilience Transcoding Using Prioritized Intra-Refresh for Video Multicast Over Wireless Networks", In Book—Signal Processing: Image Communication, vol. 22, Issue 3, Mar. 1, 2007, 22 pages.
"International Search Report and Written Opinion", Application No. PCT/EP2012/062163, (dated Aug. 7, 2012), 15 pages.
"International Search Report and Written Opinion", Application No. PCT/EP2012/062164, (dated Jul. 30, 2012), 14 pages.
"International Search Report and Written Opinion", Application No. PCT/EP2012/062162, (dated Aug. 7, 2012), 17 pages.
Chao, Yi-Chih et al., "An Approximate Square Criterion for H.264/AVC Intra Mode Decision", *Multimedia and Expo. 2888 IEEE International Conference On. IEEE*. Piscataway. NJ. USA, (Jun. 23, 2008), pp. 333-336.
Chen, Quqing et al., "Attention-Based Adaptive Intra Refresh for Error-Prone Video Transmission", *video transmission, IEEE Communications Magazine, IEEE Service Center*, Piscataway, US, vo 1 . 44, No. 1, (Jan. 1, 2007), pp. 52-60.
Lim, Keng-Pang et al., "JM text: Description of Joint Model Reference Encoding Methods and Decoding Concealment Methods", *24. JVT Meeting; 81. MPEG Meeting; 29.6.2887-5.7.2886; Geneva. CH;(Joint Video Team of ISO/IEC JTC1/SC29/WG11 and ITU-T SG . 16*, (Jul. 3, 2007), 58 pages.
Liu, Meng et al., "Rate Control Based on Intermediate Description", *Visual Communications and Image Processing*; Jul. 11, 2010-Jul. 14, 2010; Huang Shan, An Hu I , China, (Jul. 11, 2012), 10 pages.

(56) References Cited

OTHER PUBLICATIONS

Nyamweno, S et al., "Error Resilient Video Coding Via Weighted Distortion", *Multimedia and Expo*, 2009. ICME 2009. IEEE International Conference On, IEEE, Piscataway, NJ, USA, (Jun. 28, 2009), pp. 734-737.

Rolin, Ruan "A Novel Intra Refreshment Algorithm for ROI", *Multimedia and Information Technology*, 2008. MMIT '08. International Conference On, IEEE, Piscataway, NJ, USA, (Dec. 30, 2008), pp. 62-65.

Sarwer, Mohammed G., et al., "Enhanced Low Complex Cost Function for H.264/AVC Intra Mode Decision", *Multimedia and Signal Processing (CMSP). 2811 International Conference On. IEEE*, (May 14, 2011),pp. 46-50.

Song, Mingzhou et al., "Motion Estimation in DCT Domain", *IEEE*, vol. 5, (1996),pp. 670-674.

Sullivan, Gary J., et al., "Rate-Distortion Optimization for Video Compression", *IEEE final Processing Magazine*, 15(6), (Nov. 1, 1998), pp. 74-90.

Wang, Yi et al., "Off-Line Motion Description for Fast Video Stream Generation in MPEG-4 AVC/H.264", *2006 IEEE International Conference on Multimedia and Expo (ICME 2006)*, Toronto, Ont., Canada, IEEE, Piscataway, NJ, USA, (Jul. 1, 2006), pp. 685-688.

Wiegand, Thomas et al., "Error Resilient Video Transmission Using Long-Term Memory Motion-Compensated Prediction", *IEEE Journal on Selected Areas in Communications, IEEE Service Center*, Piscataway, US, val. 18, No. 6, (Jun. 1, 2000), pp. 1050-1062.

Xiong, Bing et al., "A New Multiplication-Free Block Matching Criterion", *IEEE Transactions on Circuits and Systems for Video Technology. IEEE Service Center*. Piscataway. NJ. US. vo 1 . 18. No. 18, (Oct. 1, 2008), pp. 1441-1446.

Zhang, Yuan et al., "Error Resilience Video Coding in H.264 Encoder with Potential Distortion Tracking", *Image Processing*, 2004. ICIP '04. 2004 International Conference on Singapore Oct. 24-27, 2004, Piscataway, NJ, USA,IEEE, val. 1, (Oct. 24, 2004), pp. 163-166.

"Search Report", GB Application No. 1110759.6, (dated Oct. 18, 2012), 3 pages.

"Search Report", GB Application No. 1110760.4, (dated Oct. 24, 2012), 4 pages.

"Search Report", GB Application No. 1110763.8, (dated Oct. 18, 2012), 3 pages.

"Search Report", GB Application No. 1114323.7, (dated Dec. 10, 2012), 3 pages.

"Foreign Office Action", GB Application No. 1115209.7, dated Aug. 1, 2017, 4 pages.

"Foreign Office Action", GB Application No. 1115210.5, dated Aug. 1, 2017, 5 pages.

* cited by examiner

VIDEO CODING

RELATED APPLICATION

This application claims priority under 35 U.S.C. §119 or 365 to Great Britain Application No. GB 1115210.5, filed Sep. 2, 2011. The entire teachings of the above application are incorporated herein by reference.

TECHNICAL FIELD

The present invention relates to balancing a trade-off between bitrate and distortion when selecting an encoding mode for encoding portions of a video signal.

BACKGROUND

A stream of video data to be encoded is illustrated schematically in FIG. 1a. The stream comprises multiple frames (F) each representing the video image at a different respective moment in time. As will be familiar to a person skilled in the art, for the purpose of encoding, each frame (F) is divided into portions and each portion may also be subdivided into smaller sub-portions, each portion or sub-portion comprising a plurality of pixels. For example, according to one terminology each frame of a video stream to be encoded is divided into macroblocks (MB) and each macroblock is sub-divided into blocks or subblocks (b), each block or subblock comprising multiple pixels. Each frame may also be divided into independently decodable slices (S), each slice comprising one or more macroblocks. N.B. the divisions shown in FIG. 1a are only schematic for illustrative purposes and it will be appreciated that these are not necessarily meant to correspond to any actual encoding scheme—e.g. each frame is likely to contain a larger number of macroblocks.

A goal of a video codec is to reduce the bit rate needed to transmit a video signal, while maintaining highest possible quality. This goal is achieved by exploiting statistical redundancies (similarities in the video signal) and perceptual irrelevancies (related to sensitivity of human visual system).

Most of today's video codecs are based on an architecture that includes prediction of pixel blocks from other pixel blocks, transform of prediction residuals, quantization of transform coefficients, and entropy coding of quantization indices. These steps contribute to reducing redundancies and irrelevancies.

The prediction can typically be performed from pixels in video frames other than the current frame (inter prediction) and from pixels in the same frame (intra prediction). That is, if encoded using intra frame encoding then a block, subblock or other portion of the frame (the target block or portion) is encoded relative to another block, subblock or image portion in the same frame (the reference block or portion); and if encoded using inter frame encoding then the target block or portion is encoded relative to a reference block or portion in another frame. This process is commonly referred to as prediction or prediction coding. The inter or intra prediction module will thus generate a prediction, e.g. in the form of an indication of a neighboring block or subblock in the case of intra frame encoding and/or a motion vector in the case of inter frame encoding. Typically the encoder also generates a residual signal representing a "left over" difference between the predicted block and the actual block (or predicted and actual subblocks, etc.). The residual, motion vectors and any required data associated with the intra prediction are then output into the encoded video stream, typically via further coding stages such as a quantizer and entropy encoder. Hence most blocks in the video can be encoded in terms of a difference between blocks, which requires fewer bits to encode than encoding absolute pixel values and hence saves on bitrate. Intra prediction encoding typically requires more bits than inter prediction, though still represents a saving over encoding absolute values. Details of suitable inter and intra encoding techniques for video will be familiar to a person skilled in the art.

Modern codecs allow the use of different prediction encoding modes for different portions within a frame. The possibility of having different coding options increases the rate-distortion efficiency of a video codec. The optimal coding representation has to be found for every frame region. Typically, such region is a macroblock, e.g. of 16×16 pixels. I.e. so it is possible for an intra prediction or inter prediction mode to be selected individually for each macroblock, so that different macroblocks within the same frame can be encoded with different modes. It is also possible in some codecs to use different modes based on different levels of partitioning of macroblocks, e.g. selecting between a higher complexity mode in which a separate prediction is performed for each 4×4 subblock within a macroblock or a lower complexity mode in which prediction is performed based on only 8×8 or 8×16 blocks or even whole macroblocks. The available modes may also include different options for performing prediction. For example as illustrated schematically in FIG. 1b, in one intra mode the pixels of a 4×4 subblock (b) may be determined by extrapolating down from the neighboring pixels from the subblock immediately above, or by extrapolating sideways from the subblock immediately to the left. Another special prediction mode called "skip mode" may also be provided in some codecs, which may be considered as an alternative type of inter mode. In skip mode (PSkip) the target's motion vector is inferred based on the motion vectors to the top and to the left and there is no encoding of residual coefficients. The manner in which the motion vector is inferred is consistent with motion vector prediction, thus the motion vector difference is zero and so it is only required to signal that the macroblock is a skip block.

A coding representation may thus include block partition information, prediction mode, motion vector, quantization accuracy, etc. The optimal coding option depends on video content, bit rate, earlier coding decisions, etc. The accuracy of quantization of transform coefficients is typically chosen to meet a bit rate constraint. Furthermore, distortion should be minimized.

For example, the H.264 video coder provides a great flexibility in choosing the prediction mode. For inter prediction of the luma component, a macroblock of 16×16 pixels can be represented as one block of 16×16 pixels, or two blocks of 16×8 pixels, or two blocks of 8×16 pixels, or four blocks of 8×8 pixels. Further, an 8×8 block can be represented as one block of 8×8 pixels, or two subblocks of 8×4 pixels, or two subblocks 4×8 pixels, or four subblocks of 4×4 pixels. The inter prediction is tried for each allowed partition of a macroblock. The inter prediction of a block is represented by indexing the reference frame(s) and the motion vector(s) (spatial shift from the reference block in the respective reference frame), which typically are estimated with sub-pixel precision. For intra prediction of the luma component, there are four possible modes for 16×16 blocks and nine possible modes for 4×4 subblocks. Further, there are four possible modes for chroma components. The best prediction mode is chosen by comparing the performance of inter and intra prediction modes.

The rate-distortion performance of a video codec such as H.264 AVC depends to a large extent on the performance of the macroblock mode selection o. That is, the procedure of determining whether the macroblock is best encoded, in terms of rate-distortion trade-offs, using e.g. intra mode or inter mode. From a robustness perspective, intra coded macroblocks are beneficial since they stop temporal error propagation (assuming the use of constrained intra prediction, i.e. intra prediction from inter predicted macroblocks is prohibited). However, intra coded macroblocks are generally more expensive in terms of rate compared to inter coded macroblocks, and thus it is important to introduce intra coded macroblocks systematically such that the distortion (e.g. average distortion) at the decoder is minimized given a certain bit budget and channel condition. Zhang et al., "Error resilience video coding in H.264 encoder with potential distortion tracking", (Proc. IEEE International Conference on Image Processing, pp. 163-166, 2004) (incorporated herein in its entirety) propose such a systematic framework to introduce intra coded macroblocks based on the minimization of the expected average sum of squared differences (SSD) at the decoder. By tracking the potential distortion Zhang et al are able to compute a bias term related to the expected error-propagation distortion (at the decoder) that is added to the source coding distortion when computing the cost for inter macroblocks within the encoder rate-distortion loop.

The rate-distortion performance optimization problem can be formulated in terms of minimizing distortion under a bit rate constraint R. A Lagrangian optimization framework is often used to solve the problem, according to which the optimization criterion may be formulated as:

$$J=D(m,o)+\lambda R(m,o), \qquad (1)$$

where J represents the Lagrange function, D represents a measure of distortion (a function of mode o and macroblock m or macroblock sub-partition), R is the bitrate, and $\lambda$ is a parameter defining a trade-off between distortion and rate. Commonly used distortion measures are sum of squared differences (SSD) between original and reconstructed pixels or sum of absolute differences (SAD) between the original and predicted pixels.

In this application solving the Lagrangian optimization problem means finding the encoding mode o which minimizes the Lagrange function J, where the Lagrange function J comprises at least a term representing distortion, a term representing bitrate, and a factor (the "Lagrange multiplier") representing a tradeoff between the two. As the encoding mode o is varied towards more thorough or better quality encoding modes then the distortion term D will decrease. However, at the same time the rate term R will increase, and at a certain point dependent on $\lambda$ the increase in R will outweigh the decrease in D. Hence the expression J will have some minimum value, and the encoding mode o at which this occurs is considered the optimal encoding mode.

In this sense the bitrate R, or rather the term $\lambda R$, places a constraint on the optimization in that this term pulls the optimal encoding mode back from ever increasing quality. The mode at which this optimal balance is found will depend on $\lambda$, and hence $\lambda$ may be considered to represent a tradeoff between bitrate and distortion.

The Lagrangian optimization is commonly used in the process of choosing coding decisions, and is applied for every frame region (e.g. every macroblock of 16×16 pixels). Commonly, the distortion may be evaluated to account for all processing stages. These include prediction, transform, and quantization. Furthermore, in order to compute reconstructed pixels, steps of inverse quantization, inverse transform, and inverse prediction must be performed. SSD is often preferred as distortion criterion since it results in higher quality compared to SAD. Commonly, the rate also accounts for coding of all needed parameters, including parameters describing prediction and quantized transform coefficients.

In Zhang et al., the authors estimate the potential distortion in the decoder due not only to source coding but also to channel errors, i.e. also a likely distortion that would be experienced due to loss of data when the signal is transmitted over the channel. The estimated potential distortion is then indirectly used to bias the mode selection towards intra coding (if there is a probability of channel errors).

Zhang's "end-to-end" distortion expression is based on the sum of squared differences (SSD) distortion measure and assumes a Bernoulli distribution for losing macroblocks.

The optimal macroblock mode $o_{opt}$ is given by:

$$o_{opt} = \operatorname*{argmin}_{o}(D_s(m,o) + D_{ep\_ref}(m,o) + \lambda R(m,o)), \qquad (2)$$

where $D_s(m,o)$ denotes the SSD distortion between the original and reconstructed pixels for macroblock m and macroblock mode o, R the total rate, and $\lambda$ the Lagrange multiplier relating the distortion and the rate term. $D_{ep\_ref}(m,o)$ denotes the expected distortion within the reference macroblock in the decoder due to error propagation. $D_{ep\_ref}(m,o)$ thus provides a bias term which bias the optimization toward intra coding if error propagation distortion becomes too large. $D_{ep\_ref}(m,o)$ is zero for the intra coded macroblock modes. The expression $D_s(m,o)+D_{ep\_ref}(m,o)+\lambda R(m,o)$ may be considered an instance of a Lagrange function J. Argmin$_o$ outputs the value of the argument o for which the value of the expression J is minimum.

In Zhang et al. the term $D_{ep\_ref}(m,o)$ follows the motion of the objects and is calculated from a total distortion map using the current motion vectors. The total expected error propagation distortion map $D_{ep}$ is driven by the performance of the error concealment and is updated after each macroblock mode selection as:

$$D_{ep}(m(k),n+1)=(1-p)D_{ep\_ref}(m(k),n,o_{opt})+p(D_{ec\text{-}rec}(m(k),n,o_{opt})+D_{ec\text{-}ep}(m(k),n)), \qquad (3)$$

where n is the frame number, m(k) denotes the $k^{th}$ sub-partition (i.e. block or subblock) of macroblock m, p the probability of packet loss, $D_{ec\text{-}rec}$ denotes the SSD between the reconstructed and error concealed pixels in the encoder, and $D_{ec\text{-}ep}$ the expected SSD between the error concealed pixels in the encoder and decoder.

In Zhang et al. $D_{ep}$ is stored on a 4×4 grid over each macroblock of the frame, i.e. 16 values of $D_{ep}$ per macroblock, so one value of $D_{ep}$ per 4×4 pixel subblock of each macroblock. As shown in FIG. 1c, the computation of $D_{ep\_ref}(m(k),o)$, i.e. the expected error-propagation reference distortion for a subblock k within the macroblock m of frame at time n, is then performed as a weighted sum of the values of $D_{ep}$ from four subblocks from a preceding frame from time n−1. The weights are determined from the motion vector for the block m in question. That is:

$$D_{ep\_ref}(m,(k),n) = \sum_{i=1}^{4} w_i D_{ep}(q_i(k_i), n-1), \qquad (4)$$

where the weights $w_i$ are proportional to the area of overlap and where $q_i(k_i)$ denotes subblock $k_i$ macroblock $q_i$ in a preceding frame n−1.

FIG. 1c provides an illustration of the computation of the expected error-propagation reference distortion from a motion vector and an expected error-propagation distortion map, with reference to exemplary subblocks b1 . . . b4 (in this example k corresponds to b1 and i counts through b1 . . . b4).

SUMMARY

Zhang et al. only addresses the problem of optimizing the end-to-end rate-distortion performance of a single transmitter and a single receiver. That is, Zhang et al. considers only the scenario of minimizing the end-to-end distortion (in a mean squared error sense) for a given bitrate for an individual transmitter-receiver pair.

However, in group video calling one is faced with the problem of optimizing the end-to-end rate-distortion performance for a single transmitter and multiple receivers where each transmitter-receiver link (i.e. channel) has some respective loss probability $p_i$, as illustrated schematically for example in FIGS. 4a and 4b.

In one arrangement the transmitter may transmit a different instance of the stream to each receiver, as depicted schematically in FIG. 4a. If the uplink channel and the CPU at the transmitter both have sufficient capacity then the transmitter could run several encoders in parallel, optimizing the expected end-to-end rate distortion performance for each transmitter-receiver pair. That is, if Zhang et al. was applied directly to a multi-receiver arrangement without further modification, this would only allow minimizing the end-to-end distortion (in a mean squared error sense) for a given bitrate for each individual transmitter-receiver pairs.

However, often both the uplink bandwidth and the transmitter's CPU resources constitute bottleneck, in which case the transmitter may be constrained to generate a single stream that is sent to a multicast node from which the stream is then subsequently forwarded to all the receivers, as shown schematically in FIG. 4b. For example this may occur in a group video calling scenario where three or more terminals are participating in a live video call (i.e. two or more recipients of any given one of the live video streams being transmitted between the terminals). In such a scenario the inventors have recognized that there are many different possible optimization objectives. For instance, in some cases one might want to optimize such that the average end-to-end distortion over all the receivers is minimized, and in other cases minimizing the maximum end-to-end distortion is desired.

In general it is not feasible to optimize the end-to-end rate distortion performance for each individual receiver in this case. Instead, to address the case of generating a single encoded stream for transmission when having several receivers with different associated packet loss probabilities, the inventors provide a system and method for achieving a balance between stream robustness against packet loss and source coding distortion for multiple receivers, based for example on a modification of the method of Zhang et al. This may be achieved using an aggregation of link-related properties on the different links (channels) to optimize some desired target objective function affecting a single transmission stream. The present invention thus controls the level of robustness in the encoded single video stream when having multiple receivers.

Even in a scenario such as that of FIG. 4a where the transmitter does transmit a separate instance of the stream for each of a plurality of receivers, it may still place an additional burden on the transmitter's CPU resources to perform a full loss-adaptive rate-distortion optimisation process in relation to each channel. Therefore it may still be desirable to aggregate the rate-distortion optimization process in order to transmit multiple instances of a single encoded version of the video stream to the multiple receivers, thus saving on processing resources at the transmitter, if not on uplink.

Hence in either scenario, the present invention aggregates link-related distortion properties of each channel in order to optimize a trade-off between bitrate and distortion for a single version of an encoded video stream to be transmitted to multiple receivers.

In a first embodiment a function $f$ is applied to the set of packet loss probabilities for the receivers. That is, for L receivers:

$$p=f(p_o+p_1'-p_0p_1', p_0+p_2'-p_0p_2', \ldots, p_0+p_L'-p_0p_L'), \quad (3a)$$

where it is assumed the structure shown in FIG. 4b, i.e. the loss probability from the transmitter to the receiver l via the multicast node can be expressed as:

$$1-(1-p_0)(1-p_1')=p_0+p_1'-p_0p_1'. \quad (3b)$$

The aggregated packet loss probability p can then be used in equation (3) inside the encoder. Example functions are the maximum, the median, or the mean depending what the optimization objective is. E.g., optimizing based on the maximum packet loss guarantees optimal end-to-end rate distortion performance (on average) for the worst link, and consequently less optimal performance for the other links (higher source coding distortion than would be necessary).

In a second embodiment the transmitter tracks L different error propagation maps. Only transmitter-receiver pairs that are unique, with respect to the packet loss probability, need to be tracked. It is also possible to track fewer distortion maps, for example by clustering the different links to a few different classes (e.g., classes of low, medium, and high packet losses). Furthermore, in a particularly advantageous realization of the second embodiment, it may be that feedback information from all (or some) of the receivers is available signaling what packets (or frames or slices) were received or lost at the decoders. In general different packets may be lost on the different links from the multicast node to each individual receiver. The feedback information may be used in the encoder at the transmitter to reset and re-compute the different distortion maps.

Given the different distortion maps for the different links it is possible to compose an aggregated error-propagation reference distortion (conceptually similar to the first embodiment) that we apply in the mode selection of equation (2), e.g.:

$$D_{ep\text{-}ref}(m(k),o)=f(D_{ep\text{-}ref}(m(k),o||\text{link}_1), \ldots, D_{ep\text{-}ref}(m(k),o||\text{link}_L)), \quad (4a)$$

where $f$ can be for instance, the maximum, the median, or the mean, similar to above.

The above outlines some particular exemplary embodiments, but more generally the present invention provides a system, computer program product and apparatus in line with the following.

According to one aspect of the present invention there is provided a method of encoding a video stream, the method comprising: performing a rate-distortion optimization process comprising, for each of a plurality of target image portions to be encoded in a frame of the video stream, selecting a preferred one of a set of encoding modes by optimizing a function comprising an estimate of distortion for the target image portion and a measure of bit rate required to encode the target image portion, wherein the estimate of distortion is based on source coding distortion and an estimate of error propagation distortion due to loss; and encoding the target image portions into an encoded version of the video stream using the selected encoding modes; wherein the method further comprises transmitting the same encoded version of the video stream from a transmitting terminal to each of a plurality of receiving terminals over respective lossy channels, using the same rate-distortion optimization process in relation to each of the plurality of receiving terminals, wherein the use of the same rate-distortion optimization process comprises making the same encoding mode selection per target image portion based on the same optimization of said function; and wherein the estimate of error propagation distortion comprises an aggregate estimate of error propagation distortion that would be experienced due to possible loss over the plurality of channels.

In a preferred application of the present invention, two or more of said channels may be via a common multicasting relay node, whereby the transmitting terminal may transmit the encoded version of the video stream to the multicasting relay mode over a first leg, and the multicasting relay node may forward a respective instance of the encoded version of the video stream on to each of the respective two or more receiving terminals via a respective second leg of the channel.

In the first embodiment of the present invention, the method may comprise determining an individual probability of loss over each of said channels, and determining an aggregate probability based on the individual probabilities, wherein the aggregate estimate of distortion may be based on the aggregate probability.

The individual probability for each of said two or more channels may be determined by combining probabilities of loss over each of its legs.

The relay node may comprise one of a server and an end-user terminal.

The aggregate probability may comprise one of a maximum, a median and a mean of the individual probabilities.

In the second embodiment of the present invention, the method may comprise determining an individual estimate of error propagation distortion that would be experienced due to possible loss over each of said channels, wherein the aggregate estimate of error propagation distortion may be determined by aggregating the individual estimates of error propagation distortion.

The method may comprise maintaining an individual error propagation distortion map for each of said channels, by updating the error propagation map after each encoding mode selection; wherein the individual estimate of distortion may be determined from the respective distortion map.

The aggregate of the individual estimates of distortion may comprise one of a maximum, a median and a mean of the individual estimates of distortion.

The individual estimates of error propagation distortion for each of one or more of said channels may be based on feedback from the respective receiving terminal.

Said feedback may comprise one of: an acknowledgement that at least part of said earlier frame has been received, and a report that at least part of said earlier frame has not been received.

The individual estimates of error propagation distortion based on feedback may comprise: adjusting the estimate of distortion for an earlier frame or part of the earlier frame in dependence on said feedback, and propagating the adjusted estimate of distortion forward for use in relation to a current frame.

The individual estimate of error propagation distortion based on feedback may comprise: adjusting the estimate of distortion for the earlier frame or part of the earlier frame in dependence on at least one of said acknowledgment and said report, and propagating the adjusted estimate of distortion forward for use in relation to the current frame.

In either embodiment, the first and second embodiments may be applied either independently or in combination.

The encoding modes may comprise at least (i) an intra frame mode which encodes the target image portion relative to a reference image portion in the same frame, and (ii) an inter frame encoding mode which encodes the target image portion relative to a reference image portion in a previously encoded frame.

The set of encoding modes may comprise a skip mode.

The set of encoding modes may comprise modes using different partitions of the target image portion for at least one of intra and inter frame encoding.

According to another aspect of the present invention, there is provided a transmitting terminal for encoding a video stream, the transmitting terminal comprising: an encoder configured to perform a rate-distortion optimization process comprising, for each of a plurality of target image portions to be encoded in a frame of the video stream, selecting a preferred one of a set of encoding modes by optimizing a function comprising an estimate of distortion for the target image portion and a measure of bit rate required to encode the target image portion, wherein the estimate of distortion is based on source coding distortion and an estimate of error propagation distortion due to loss, the encoder being arranged to encode the target image portions into an encoded version of the video stream using the selected encoding modes; and a transmitter configured to transmit the same encoded version of the video stream from the transmitting terminal to each of a plurality of receiving terminals over respective lossy channels, the encoder being configured to use the same rate-distortion optimization process in relation to each of the plurality of receiving terminals, wherein the use of the same rate-distortion optimization process comprises making the same encoding mode selection per target image portion based on the same optimization of said function; and wherein the encoder is further configured such that said estimate of error propagation distortion comprises an aggregate estimate of error propagation distortion that would be experienced due to possible loss over the plurality of channels.

In embodiments, the transmitter may be configured to operate in accordance with any of the above method features.

According to another aspect of the present invention, there is provided a computer program product for encoding a video stream, the computer program product being embodied on a computer-readable medium and comprising code configured so as when executed on a transmitting terminal to perform operations of: performing a rate-distortion optimization process comprising, for each of a plurality of target image portions to be encoded in a frame of the video stream, selecting a preferred one of a set of encoding modes by optimizing a function comprising an estimate of distortion for the target image portion and a measure of bit rate required to encode the target image portion, wherein the estimate of distortion is based on source coding distortion and an estimate of error propagation distortion due to loss; and encoding the target image portions into an encoded version of the video stream using the selected encoding modes; wherein the code is further configured so as when executed to transmit the same encoded version of the video stream from the transmitting terminal to each of a plurality of receiving terminals over respective lossy channels, using the same rate-distortion optimization process in relation to each of the plurality of receiving terminals, wherein the use of the same rate-distortion optimization process comprises making the same encoding mode selection per target image portion based on the same optimization of said function; and wherein the estimate of error propagation distortion comprises an aggregate estimate of error propagation distortion that would be experienced due to possible loss over the plurality of channels.

In embodiments, the code may be further configured so as when executed to perform operations in accordance with any of the above method features.

The invention may be particularly (but not exclusively) applicable when encoding a video stream in real-time, i.e. a live video stream such as that of a video call, where the encoder has to dynamically encode the stream for transmission as-and-when it is received from the camera or such like.

BRIEF DESCRIPTION OF THE DRAWINGS

For a better understanding of the present invention and to show how it may be put into effect, reference is made by way of example to the accompanying drawings in which.

DETAILED DESCRIPTION

Figure 2:
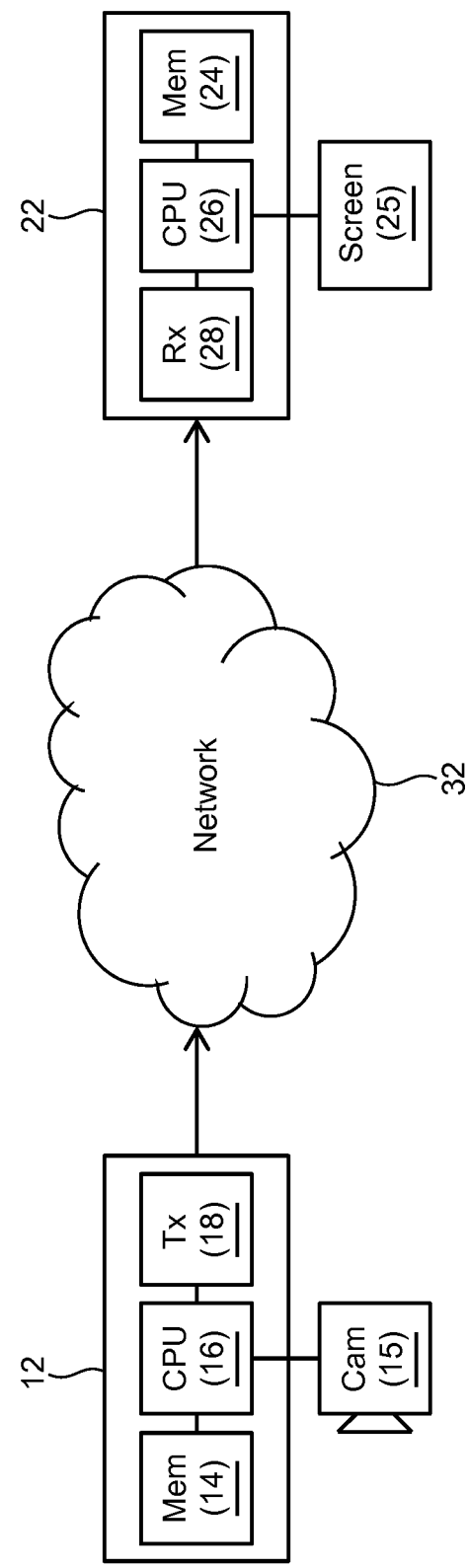
FIG. 2 is a schematic block diagram of a communication system.

An example communication system in which video coding may be employed is illustrated schematically in the block diagram of FIG. 2. The communication system comprises a first, transmitting terminal 12 and a second, receiving terminal 22. For example, each terminal 12, 22 may comprise a mobile phone or smart phone, tablet, laptop computer, desktop computer, or other household appliance such as a television set, set-top box, stereo system, etc. The first and second terminals 12, 22 are each operatively coupled to a communication network 32 and the first, transmitting terminal 12 is thereby arranged to transmit signals which will be received by the second, receiving terminal 22. Of course the transmitting terminal 12 may also be capable of receiving signals from the receiving terminal 22 and vice versa, but for the purpose of discussion the transmission is described herein from the perspective of the first terminal 12 and the reception is described from the perspective of the second terminal 22. The communication network 32 may comprise for example a packet-based network such as a wide area internet and/or local area network, and/or a mobile cellular network.

The first terminal 12 comprises a storage medium 14 such as a flash memory or other electronic memory, a magnetic storage device, and/or an optical storage device. The first terminal 12 also comprises a processing apparatus 16 in the form of a CPU having one or more cores; a transceiver such as a wired or wireless modem having at least a transmitter 18; and a video camera 15 which may or may not be housed within the same casing as the rest of the terminal 12. The storage medium 14, video camera 15 and transmitter 18 are each operatively coupled to the processing apparatus 16, and the transmitter 18 is operatively coupled to the network 32 via a wired or wireless link. Similarly, the second terminal 22 comprises a storage medium 24 such as an electronic, magnetic, and/or an optical storage device; and a processing apparatus 26 in the form of a CPU having one or more cores. The second terminal comprises a transceiver such as a wired or wireless modem having at least a receiver 28; and a screen 25 which may or may not be housed within the same casing as the rest of the terminal 22. The storage medium 24, screen 25 and receiver 28 of the second terminal are each operatively coupled to the respective processing apparatus 26, and the receiver 28 is operatively coupled to the network 32 via a wired or wireless link.

The storage medium 14 on the first terminal 12 stores at least a video encoder arranged to be executed on the processing apparatus 16. When executed the encoder receives a "raw" (unencoded) input video stream from the video camera 15, encodes the video stream so as to compress it into a lower bitrate stream, and outputs the encoded video stream for transmission via the transmitter 18 and communication network 32 to the receiver 28 of the second terminal 22. The storage medium on the second terminal 22 stores at least a video decoder arranged to be executed on its own processing apparatus 26. When executed the decoder receives the encoded video stream from the receiver 28 and decodes it for output to the screen 25. A generic term that may be used to refer to an encoder and/or decoder is a codec.

Figure 3:
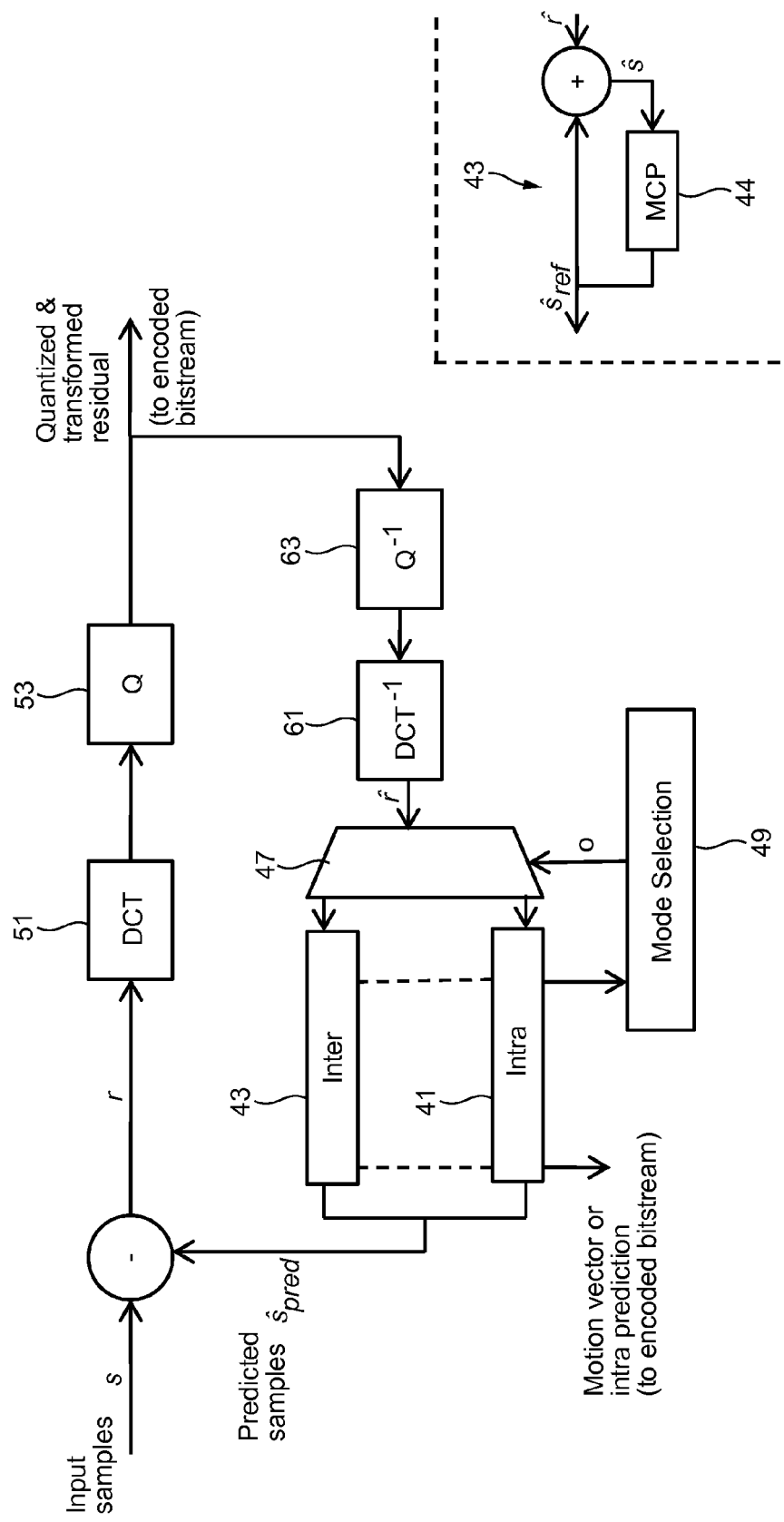
FIG. 3 is a schematic block diagram of an encoder.

FIG. 3 is a high-level block diagram schematically illustrating an encoder such as might be implemented on transmitting terminal 12. The encoder comprises: a discrete cosine transform (DCT) module 51, a quantizer 53, an inverse transform module 61, an inverse quantizer 63, an intra prediction module 41, an inter prediction module 43, and a subtraction stage (−). The encoder also comprises a switch 47 and mode selection module 49. Each of the modules is preferably implemented as a portion of code stored on the transmitting terminal's storage medium 14 and arranged for execution on its processing apparatus 16, though the possibility of some or all of these being wholly or partially implemented in dedicated hardware circuitry is not excluded.

Each of the switch 47 and mode selection module 49 is arranged to receive an instance of the input video stream comprising a plurality of macroblocks MB. The mode selection module 49 is arranged to select a coding mode "o" for each macroblock and is operatively coupled to the multiplexer 47 so as to control it to pass the output of the inverse quantizer 63 to the input of either the intra prediction module 41 or inter prediction module 43 as appropriate to the selected mode. The mode selection module 49 may also be arranged to indicate the selected mode "o" to the relevant prediction module 41, 43 (e.g. to indicate a 4×4 partition mode, 8×8 mode, skip mode, etc.), and to receive information fed back from the prediction module 41, 43 for use in selecting the modes for the next frame. The output of the intra prediction module 41 or inter prediction module 43 is then coupled on to an input of the subtraction stage (−)

which is arranged to receive the unencoded input video stream at its other input and subtract the predicted blocks from their unencoded counterparts, thus generating the residual signal. The residual blocks are then passed through the transform (DCT) module 51 where their residual values are converted into the frequency domain, then to the quantizer 53 where the transformed values are converted to discrete quantization indices. The quantized, transformed signal is fed back though the inverse quantizer 63 and inverse transform module 61 to generate a predicted version of the blocks or subblocks (as would be seen at the decoder) for use by the selected prediction module 41, 43. An indication of the predictions used in the prediction modules 41,43, the motion vectors generated by the inter prediction module 43 and the quantized, transformed indices of the residual as generated by the transform and quantization modules 51, 53 are all output for inclusion in the encoded video stream; typically via a further, lossless encoding stage such as an entropy encoder (not shown) where the prediction values and transformed, quantized indices may be further compressed using lossless encoding techniques known in the art.

Figure 1A:
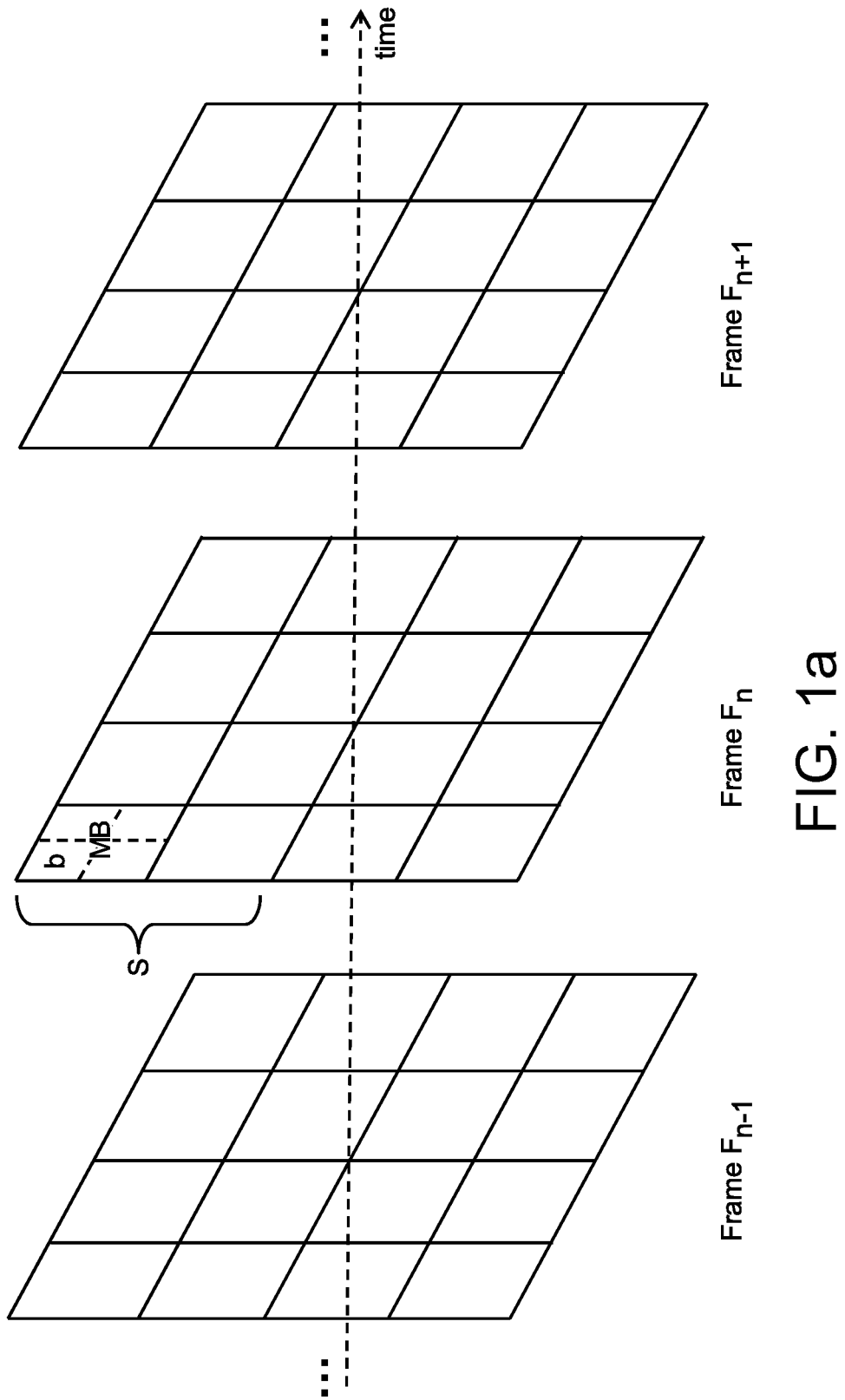
FIG. 1a is a schematic representation of a video stream.
Figure 1B:
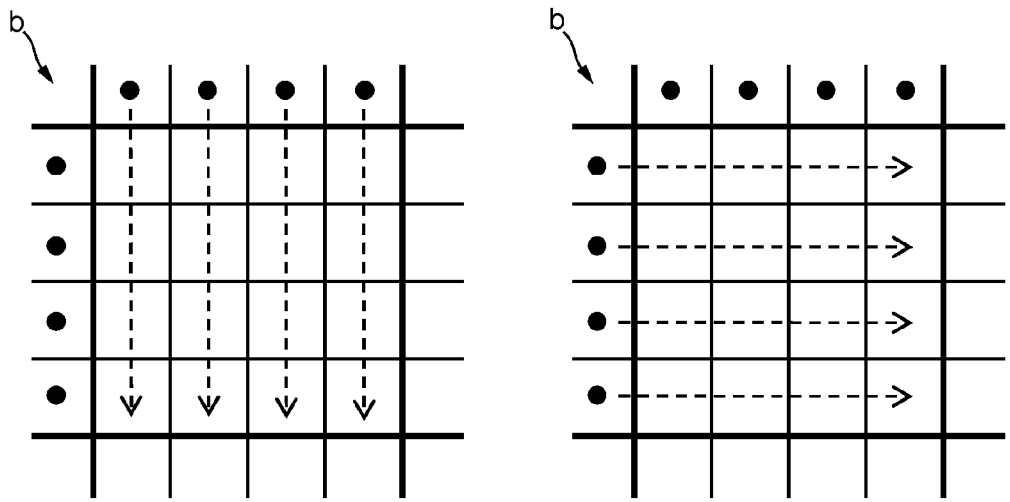
FIG. 1b is a schematic representation of some intra prediction coding modes.

The following describes an encoder and encoding method which aggregates link-related distortion properties of each channel in order to optimize a trade-off between bitrate and distortion for a single version of an encoded video stream to be transmitted to multiple receivers. The encoder is similar to that described in relation to FIG. 3, but with a modified mode selection module 49. It may be used to encode a video stream of the kind illustrated in FIG. 1, and implemented in a communication system such as that of FIG. 2.

As mentioned, mode selection may involve optimizing (e.g. minimizing) a Lagrangian type function:

$$J=D(m,o)+\lambda R(m,o), \quad (1)$$

where J represents the Lagrange function, D represents a measure of distortion (a function of mode o and macroblock m or macroblock sub-partition), R is the bitrate, and $\lambda$ is a parameter defining a trade-off between distortion and rate.

In a conventional case the distortion term D only takes into account the source coding distortion, i.e. due to imperfections in the encoder such as the distortion introduced by quantization. It does not take into account the distortion that may be introduced due to loss of data over the channel, e.g. due to packet loss in transmission over a packet-based network 32.

On the other hand, loss adaptive techniques such as those of the present invention and Zhang et al. attempt to define a measure of "end-to-end" distortion taking into account both the source encoding and the distortion due to loss of data over the channel. The end-to-end distortion for a given (target) block, macroblock or subblock may be described as:

$$D=(1-p)D_{arrival}+pD_{loss} \quad (5)$$

where $D_{arrival}$ is an estimate of the distortion that will be experienced if the target block does arrive at the decoder, and $D_{loss}$ is an estimate of the distortion that will be experienced if the target block does not arrive at the decoder due to packet loss over the channel, e.g. due to loss of a packet comprising that block over a packet-based network 32. The parameter p is an estimate of the probability of a loss event occurring over the channel that results in the block or image portion in question being lost, e.g. an estimate of the probability of a packet loss. For convenience the term "block" may be used in places here to refer generally to the relevant level of frame partition (e.g. a block or subblock of certain standards such as H.264).

$D_{arrival}$ represents not only the source coding distortion but also the distortion that will be introduced due to distortion of a block's past, i.e. distortion in one or more reference blocks from which the target block is to be predicted. Therefore $D_{arrival}$ comprises both a source coding distortion term $D_s$ and an error propagation distortion term $D_{ef\_ref}$ which represents a distortion in the predicted target block's history (i.e. distortion in the target blocks' reference block which will carry forward into the target block):

$$D_{arrival}=D_s+D_{ep\_ref} \quad (6)$$

$D_{loss}$ comprises a loss due to concealment. If a target block is not received then the decoder will apply a concealment algorithm which could involve freezing a previously decoded block, or interpolating or extrapolating from one or more successfully decoded blocks (either from the current frame and/or a previous frame). Therefore $D_{loss}$ can be identified as the distortion due to this concealment process:

$$D_{loss}=D_{ec} \quad (7)$$

So examining equation (5), the term $D_s$ represents an estimate of the distortion that will be experienced if there is no loss at all, the term $D_{ec}$ represents an estimate of the distortion that will be experienced if the target block is lost, and the term $D_{ep\_ref}$ represents an estimate of the distortion that will be experienced if the target block is successfully received but something in its history is lost (if the target block's reference block is lost, or the reference block's reference block is lost, etc.)

$D_s$ and $D_{ep\_ref}$ are functions of encoding mode selection o. $D_{ec}$ is not a function of mode selection o and so is dropped from the Lagrange expression (it does not matter how a lost block was encoded—it is still lost). Hence the optimization can be written as:

$$o_{opt}=\operatorname*{argmin}_{o}(D_s(m,o)+D_{ep\_ref}(m,o)+\lambda R(m,o)), \quad (2)$$

$D_s$ is deterministic as it is based on information that can be known at the encoder, for example based on the difference between the raw input sample values s and the reconstructed sample values $\hat{s}$. The encoder runs a parallel instance of the decoder at the encoder side (or an approximation of it)—see the inset detailing the inter prediction module 43 in FIG. 3. The inter prediction module 43 comprises a motion compensation prediction (MCP) block 44 and addition stage (+) arranged to determine the reconstructed samples $\hat{s}$ by combining the predicted samples $\hat{s}_{pred}$ and the reconstructed residual $\hat{r}$, i.e. $\hat{s}_i=\hat{r}_i+\hat{s}_{pred}$ for each sample index i. In the case of inter encoding, at the encoder the predicted samples $\hat{s}_{pred}$ may be the same as the samples of the reference block $\hat{s}_{ref}$ (the reference block in the reference frame just being offset by the motion vector relative to the target frame—see FIG. 1c, to be discussed again shortly).

Hence the encoder can determine the difference between the actual samples s and the reconstructed samples $\hat{s}$ as seen at the encoder and decoder end (this so far ignores the possibility of loss which will introduce further distortion experienced at the decoder). The difference in samples may be calculated for example as the sum square difference (SSD) error over all sample indices i of the target block in question:

$$D_s=\sum_i [(s_i-\hat{s}_i)^2] \quad (8)$$

However, $D_{ep\_ref}$ remains to be estimated, which will be based on making some estimation concerning the channel over which the encoded data is to be transmitted (e.g. over packet-based network 32).

To achieve this, the mode selection module 49 in the encoder may be configured to maintain an error propagation distortion map $D_{ep}$ describing the distortion of each macroblock or partition of a macroblock within the most recently encoded frame. The mode selection module 49 is also arranged to determine a probability p that the packet containing the reference block from which a target block is to be predicted will be lost over the channel (and therefore also to implicitly or explicitly determine a probability 1−p that the packet does arrive). The probability p may be predetermined at the design stage based on statistical modelling, in which case the mode selection module 49 determines p by retrieving a value from memory 14. Another is that the mode selection module 49 determines p based on feedback from the receiver 22.

The error propagation map may be expressed as:

$$D_{ep}=(1-p)D_{ep\_arrival}+pD_{loss} \quad (9)$$

The error propagation map $D_{ep}$ comprises a distortion estimate for macroblock m or more preferably for each sub partition (block or sub-block) m(k) within the most recently encoded frame. Hence it may be more explicitly written as:

$$D_{ep}(m(k))=(1-p)D_{ep\_arrival}(m(k))+pD_{loss}(m(k)) \quad (10)$$

where m(k) denotes the $k^{th}$ sub-partition (e.g. sub-block) of macroblock m and p the probability of packet loss.

$D_{loss}$ is equal to $D_{ec}$ as discussed above. $D_{ep\_arrival}$ represents the differences over the channel, i.e. the difference between the reconstructed samples at the encoder and the reconstructed at the decoder. For example this could be quantified in terms of the sum of squared differences (SSD):

$$D_{ep\_arrival} = \sum_i (\hat{s}_i - \tilde{s}_i)^2 \quad (11)$$

where $\tilde{s}_i$ are the samples (of indices i) received at the decoder taking into account both the source coding distortion and the distortion due to the channel. I.e. $s_i$ are the raw unencoded input samples, $\hat{s}_i$ are the reconstructed samples at the encoder taking into account the source coding distortion (e.g. due to quantization), and $\tilde{s}_i$ are the samples taking into account the total end-to-end distortion including the lossy effect of the channel; $s_i \rightarrow \hat{s}_i \rightarrow \tilde{s}_i$.

$D_{ep\_arrival}$ can be expanded to:

$$D_{ep\_arrival} = \sum_i ((\hat{s}_{ref} + \hat{r}_i) - (\tilde{s}_{ref} + \hat{r}_i))^2 \quad (12)$$

where $\hat{r}_i$ are the samples of the reconstructed residual. Therefore:

$$D_{ep\_arrival} = \sum_i (\hat{s}_{ref} - \tilde{s}_{ref})^2 = D_{ep\_ref} \quad (13)$$

So substituting into equation (9), the error propagation map can be rewritten as:

$$D_{ep}=(1-p)D_{ep\_ref}+pD_{ec} \quad (14)$$

or:

$$D_{ep}(m(k))=(1-p)D_{ep\_ref}(m(k))+pD_{ec}(m(k)) \quad (15)$$

Considering the mode optimization problem, it may also be written:

$$D_{ep}(m(k),n+1)=(1-p)D_{ep\_ref}(m(k),n,o_{opt})+pD_{ec}(m(k),n,o_{opt}) \quad (16)$$

where n is the frame number, i.e. $D_{ep}(n+1)$ is the error propagation map to be used for making the mode selection for frame at a time n+1 given the existing decision $o_{opt}$ and distortion $D_{ep}(n)$ map for frame at a preceding time n.

As in Zhang [2], the $D_{ec}$ term may be also expanded:

$$D_{ep}(m(k),n+1)=(1-p)D_{ep\_ref}(m(k),n,o_{opt})+p(D_{ec\_rec}(m(k),n,o_{opt})+D_{ec\_ep}(m(k),n)), \quad (3)$$

where $D_{ec\_rec}$ denotes the SSD between the reconstructed and error concealed pixels in the encoder, and $D_{ec\_ep}$ the expected SSD between the error concealed pixels in the encoder and decoder.

Examining equation (3), as explained above, the term $D_{ep\_ref}$ represents the distortion that will be experienced if the target block is successfully received but something in its history is lost (if the target block's reference block is lost, or the reference block's reference block is lost, etc.). Further, $D_{ec\_rec}$ represents an estimate of the distortion due to the nature of the concealment algorithm itself (somewhat analogous to the intrinsic source coding distortion $D_s$ for prediction). $D_{ec\_ep}$ then represents an estimate of the distortion that will be experienced if both the target block is lost (and so needs to be concealed at the decoder) and something in the concealed target block's history is lost (if the block from which concealment is done is lost, or the block from which that block is predicted or concealed is lost, etc.).

So the distortion map $D_{ep}$ comprises a contribution due to new loss, resulting from $D_{ec\_rec}$ and in part from $D_{ec\_ep}$; and a contribution due to past loss, resulting from $D_{ep\_ref}$ and in part also from $D_{ec\_ep}$.

For the first frame in a sequence the frame will be coded with intra coding, in which case $D_{ep\_ref}=0$ and therefore $D_{ep}=pD_{ec}$.

The error concealment distortion $D_{ec}$ is calculated by the mode selection module 49. The term $D_{ec\_rec}$ is based on knowledge of the concealment algorithm, and may depend on the particular error concealment algorithm used. $D_{ec\_ep}$ is calculated based on the existing (most recent) distortion map in a manner analogous to $D_{ep\_ref}$, e.g. by copying the distortion of a co-located block in the case of a basic concealment algorithm or calculating a weighted sum of the distortions from multiple previously encoded blocks b1-b4 if a more complex concealment is used that attempts to extrapolate motion (by analogy see discussion in relation to FIG. 1c below). Other ways of calculating $D_{ec}$ could be used—this could be any estimation of a difference between the reconstructed samples in the encoder and the error concealed samples as would be seen ay the decoder (i.e. the samples copied, interpolated or extrapolated from a previous received frame or a received region of the same frame to conceal the lost frame or region).

The mode selection module 49 then maintains the error propagation map for each subsequent inter predicted frame by updating it following each mode selection decision, now including a calculation of $D_{ep\_ref}$ from knowledge of the existing error map. In the case of inter prediction (motion estimation), according to Zhang et al. this is done using the motion vectors for the frame in question.

Figure 1C:
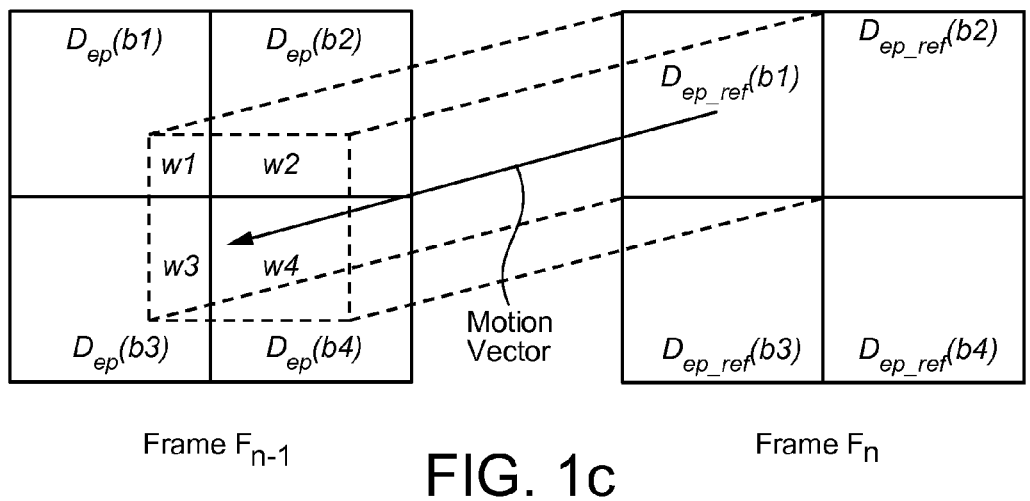
FIG. 1c is a schematic representation of a calculation of error propagation distortion.

An example of this is illustrated in FIG. 1c. Four example blocks b1, b2, b3 and b4 are shown in a reference frame $F_n$ (at time n−1), the reference frame having already been encoded. The blocks of the target frame $F_n$ (at a subsequent time n) are to be predicted from the reference frame $F_{n-1}$. For example consider a target block $b_1$ in the target frame $F_n$. To this end the motion prediction module 44 determines a motion vector defining an offset between the target block in the target frame $F_n$ and a reference block (shown by the dotted line) in the reference frame $F_{n-1}$, such that when the reference block is translated from the offset position in the reference frame $F_{n-1}$ into the position of the target block $b_1'$ in the target frame $F_n$ it provides a best estimate of the target block $b_1$. Note therefore that the dotted reference block is not necessarily an indexable block in the reference frame $F_{n-1}$, i.e. is not necessarily a predetermined subdivision of the reference frame, and may be offset by any arbitrary amount (and in fact may even be offset by a fractional number of pixels). Hence the reference block is made up of a contribution from four actual indexable blocks b1, b2, b3 and b4.

Accordingly, the existing calculation performed by the mode selection module 49 to determine $D_{ep\_ref}$ for use in the update of the error propagation map $D_{ep}(n+1)$ comprises calculating a weighted sum of the distortions recorded for blocks or subblocks b1 to b4 in the existing map $D_{ep}(n)$:

$$D_{ep\_ref} = \sum_{i=1}^{4} w_i D_{ep}(i) \qquad (17)$$

Or more explicitly:

$$D_{ep\_ref}(m, (k), n) = \sum_{i=1}^{4} w_i D_{ep}(b_i, n-1), \qquad (4b)$$

where $w_i$ is the weight representing the contribution from block or subblock $b_i$ and $D_{ep}(i)$ is the error propagation map entry for block or subblock $b_i$.

The above describes an existing process of determining an initial error propagation map $D_{ep}$, using the error propagation map to select an optimal coding mode decision $o_{opt}$ for a subsequent coding, using the coding decision to update the map $D_{ep}$, then using the updated map in the next coding decision, and so forth, wherein the error propagation map represents an end-to-end distortion including an estimated effect of loss over the channel E.g. reference is made again to Zhang et al. This may be referred to herein as loss-adaptive rate-distortion optimization (LARDO).

However, the process of Zhang et al. only addresses the problem of optimizing the end-to-end rate-distortion performance of a single transmitter and a single receiver.

In group video calling scenario on the other hand, one is faced with the problem of optimizing the end-to-end rate-distortion performance for a single transmitter and multiple receivers where each transmitter-receiver link (i.e. channel) has some respective loss probability $p_i$. Examples of this are illustrated schematically in FIGS. 4a and 4b.

Figure 4B:
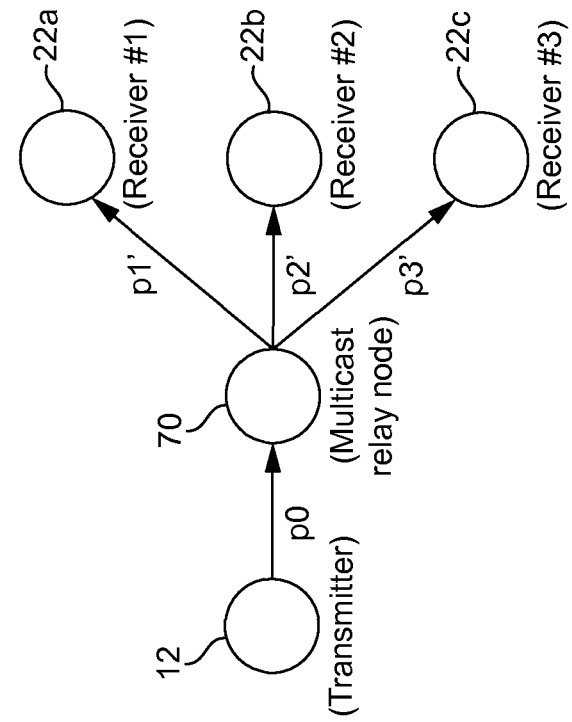
FIGS. 4a and 4b represent example topologies for one transmitter and multiple receivers.

FIG. 4b illustrates an arrangement in accordance with a preferred application of the present invention. The arrangement comprises a transmitting terminal 12, a multicasting relay node 70, and a plurality of receiving terminals 22. Three receiving terminals 22a, 22b and 22c are shown here for illustrative purposes but it will be appreciated that any number from two upwards could be present. The transmitter 12 may be configured in accordance with FIG. 2 and comprise an encoder in accordance with that described in relation to FIG. 3, but with a modified mode selection module 49 configured in accordance with the following. Each of the receivers 22 may be configured in accordance with FIG. 2 and comprise a respective decoder configured to complement the encoder of FIG. 3. The relay node may comprise a third end-user-terminal such as a laptop or desktop computer belonging to a third user who has agreed to facilitate a scheme, or alternatively may comprise a server of a communication service provider. In the case where the relay 70 is an end-user terminal, the third user may or may not be a participant in the call (i.e. may or may not be decoding the video stream for play-out at the third-user terminal 70 and may or may not be authorised to do so).

The transmitting terminal 12 is arranged to establish a connection with the multicasting relay node 70 via a packet-based network 32 such as the Internet; and the multicasting relay node 70 is arranged to establish a respective connection with each of the receiving terminals 22, again via a packet-based network 32 such as the Internet. The channel (i.e. link) from the transmitting terminal 22 to each respective receiving terminal 22 comprises: a first leg (i.e. first stage) in the form of the connection between the transmitting terminal 12 and the relay node 70, and a respective second leg (i.e. second stage) in the form of the connection between the relay node 70 and the respective second terminal 22.

The first leg has an associated probability of packet loss $p_0$. Each of the second legs has a respective probability of packet loss $p_1'$, $p_2'$, $p_3'$. In general these probabilities are not the same. In the following, each channel or its receptive receiver may also be referred to by the numbering $l=1 \ldots L$, e.g. where L=3 in the illustrated example.

In accordance with the arrangement of FIG. 4b, the encoder on the transmitting terminal 12 is configured to generate only a single encoded version of the video stream for transmission to each of a plurality of the receiving terminals 22, and to transmit that encoded video stream to the common multicasting relay node 70 via the first leg (and only to that relay node 70 unless other recipients or relays, not shown, are connected to the transmitter 12 as part of a more complex "tree" type structure). The multicasting relay node 70 is configured to forward a respective instance of the encoded version of the video stream onwards to each of the receiving terminals 22 via a respective second leg of the respective channel.

As discussed previously, if Zhang et al. was applied directly to a multi-receiver arrangement without further modification, this would only allow minimizing the end-to-end distortion (in a mean squared error sense) for a given bitrate for each individual transmitter-receiver pairs.

Therefore Zhang et al. alone would not support an arrangement as described in relation to FIG. 4b.

However, as also discussed, often both the uplink bandwidth and the transmitter's CPU resources constitute bottleneck, in which case the transmitter may be constrained to generate a single stream that is sent via a multicast node as in FIG. 4b. For example this may occur in a group video calling scenario where three or more terminals are participating in a live video call. In such a scenario the inventors have recognized that there are many different possible optimization objectives. For instance, in some cases one might want to optimize such that the average end-to-end distortion over all the receivers is minimized, and in other cases minimizing the maximum end-to-end distortion is desired.

To address this, the improved system and method described in the following uses an aggregation of link-related properties on the different links or channels in order to optimize a desired target objective function affecting a single transmission stream. The level of robustness in the encoded single video stream may then be optimized for multiple receivers.

As the encoder on the transmitting terminal generates and transmits only a single encoded version of the video stream for transmission to each of a plurality of the receiving terminals 22 (via the relay 70), and as this is based on an aggregated estimate in relation to the plurality of respective channels, then the encoded video stream sent to each of the receiving terminals 12 contains the same mode selections for a given macroblock, arrived at based on the same rate-distortion optimisation calculation performed for any given macroblock. This saves on uplink bandwidth and on CPU resources at the transmitter.

In a first embodiment a function $f$ is applied to the set of packet loss probabilities for the receivers. That is, for L receivers 22:

$$p=f(p_0+p_1'-p_0p_1', p_0+p_2'-p_0p_2', \ldots, p_0+p_L'-p_0p_L'), \quad (3a)$$

where it is assumed the structure shown in FIG. 4b, i.e. the loss probability from the transmitter 12 to the receiver 22 number 1 via the multicast node can be expressed as:

$$1-(1-p_0)(1-p_1')=p_0+p_1'-p_0p_1'. \quad (3b)$$

The aggregated packet loss probability p can then be used in equation (3) inside the encoder. Example functions are the maximum, the median, or the mean depending what the optimization objective is. E.g., optimizing based on the maximum packet loss guarantees optimal end-to-end rate distortion performance (on average) for the worst link, and consequently less optimal performance for the other links (higher source coding distortion than would be necessary).

In a second embodiment the transmitter 12 tracks L different error propagation maps, each for a respective one of the channels to a respective one of the receivers 22. This may be achieved by applying equation (3) for each receiver 22 and its receptive channel, but using the respective loss probability of equation (3b) for each channel in place of the general parameter p in equation (3).

Only transmitter-receiver pairs that are unique, with respect to the packet loss probability, need to be tracked. It is also possible to track fewer distortion maps, for example by clustering the different links to a few different classes (e.g., classes of low, medium, and high packet losses).

Given the different distortion maps for the different links (channels) it is possible to compose an aggregated error-propagation reference distortion (conceptually similar to the first embodiment) that we apply in the mode selection of equation (2), e.g.:

$$D_{ep-ref}(m(k),o)=f(D_{ep-ref}(m(k),o|\text{link}_1), \ldots, D_{ep-ref}(m(k),o|\text{link}_L)), \quad (4a)$$

where $f$ can be for instance, the maximum, the median, or the mean, similar to above.

In an optional but particularly advantageous realization of the second embodiment, there may be available feedback information from all (or some) of the receivers, signaling what packets (or frames or slices) were received or lost at the decoders. In general different packets may be lost on the different links from the multicast node to each individual receiver. The feedback information may be used in the encoder at the transmitter to reset and re-compute the different distortion maps. Individual distortion maps are tracked for the different receivers, even for the case when the different links have the same loss probability.

Figure 5:
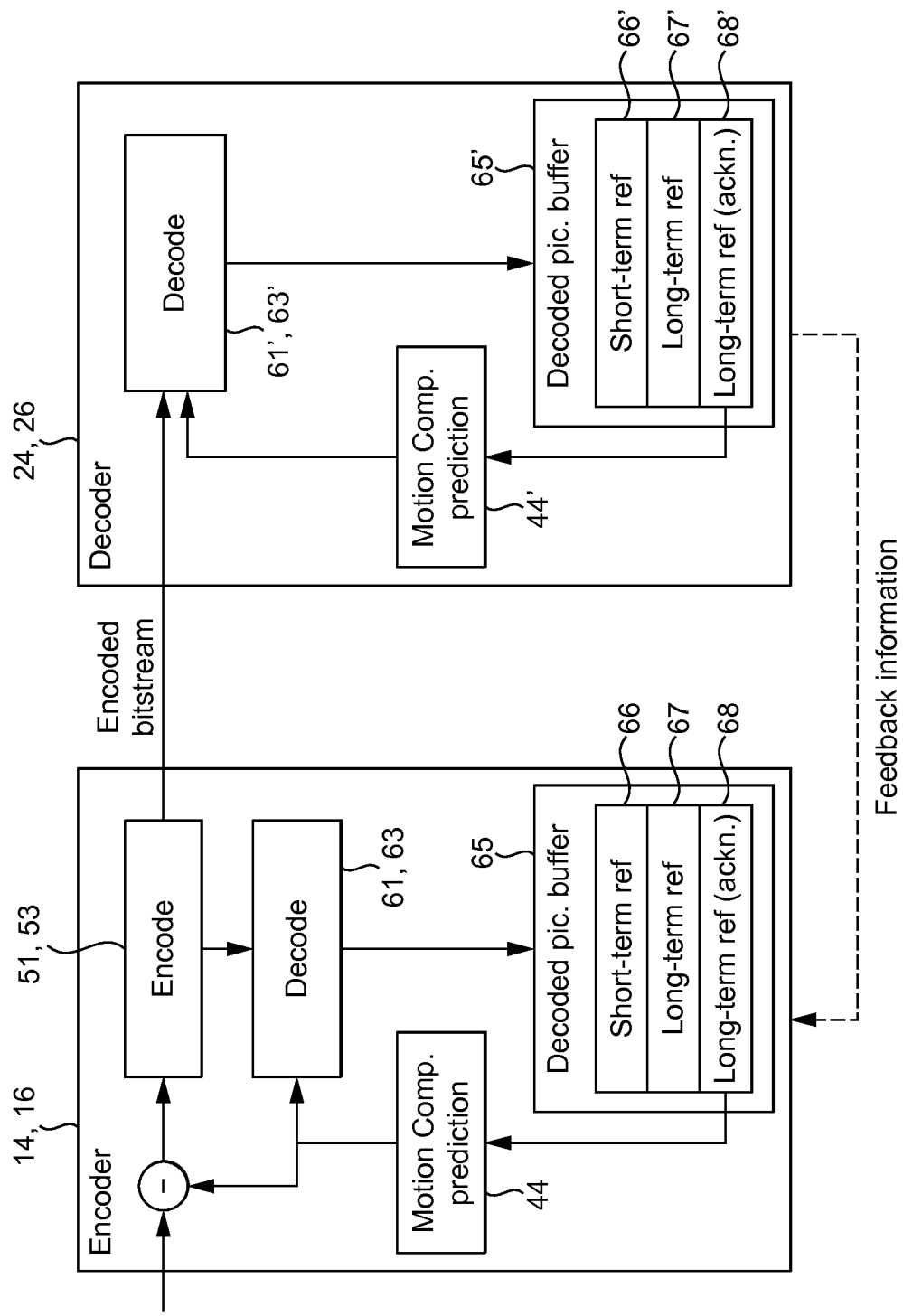
FIG. 5 is a schematic block diagram of a system employing feedback from a decoder to an encoder.

FIG. 5 is a schematic block diagram depicting a system of encoder and decoder that may be used to implement the update of the distortion maps based on feedback. Preferably the encoder is manifested in the storage 14 and processing apparatus 16 of the transmitting terminal 12, and the decoder is manifested in the storage medium 24 and processing apparatus 26 of the receiving terminal 22. The encoder on the transmitting terminal 12 comprises an encoding module and an encoder-side instance of a decoding module mirroring or approximating the decoding as performed at the decoder. The encoding module comprises the forward transform module 51 and quantizer 53, as well as potentially one or more other stages such as an entropy encoder. The encoder-side decoding module comprises the inverse quantizer 63 and inverse transform module 61, as well as potentially other stages such as an entropy decoder. The encoder also comprises the motion compensation prediction (MCP) module 44, and subtraction stage (−). Reference is made again to FIG. 3 for an explanation of the connections between these encoder elements.

Furthermore, not shown in FIG. 3 is that the encoder also comprises a decoded picture buffer 65 connected in the path between the encoder-side decoding module 61, 63 and the motion compensation prediction module 44. The decoded picture buffer 65 may comprise a plurality of constituent buffer regions each of which may be marked as holding either a short-term reference or a long-term reference. In FIG. 5 the decoded picture buffer 65 is shown as holding one or more short-term references 66, one or more unacknowledged long-term references 67, and one or more acknowledged long-term references 68.

Each constituent buffer region is operable to store a reconstructed version of one or more previously encoded frames or slices (i.e. having been encoded and then decoded again by the encoder-side instance of the decoding module 61, 63 so as to represent the frame or slice as would be seen at the encoder). These reconstructed versions of previously encoded frames or slices are provided for use as a reference in the inter prediction coding of a current frame or slice, i.e. so that target blocks to be encoded can be coded relative to reference blocks in the buffers.

The decoder on the receiving terminal 24 comprises decoder-side instances 44', 61', 63', 65', 66', 67' and 68' of the motion compensation prediction module 44, decoding module 61, 63, and decoded picture buffer 65 arranged to store corresponding short and long term references 66, 67 and 68.

The decoder on the receiving terminal 24 is configured to communicate with the encoder on the transmitting terminal 12 via a feedback channel. The feedback is preferably via the same network 32 by which the video stream is transmitted to the receiving terminal 22, e.g. the same packet-based network such as the Internet, though the possibility of an alternative feedback mechanism is not excluded.

With reference to the exemplary implementation of FIG. 5, the feedback is considered to contain information about the decoded picture buffer 65' at the decoder. Given this feedback the encoder knows for example which frames or slices in the decoder were decoded without containing any error-propagation distortions. In FIG. 5 the entry 68 in the decoded picture buffer 65 refers to such an acknowledged error-free frame. The entry 67 in the decoded picture buffer 65 refers to an unacknowledged frame. The feedback mechanism can be used to make the encoder aware of what is the latest acknowledged long-term reference available at the decoder (in addition to information about which frames have been lost).

In the optional feedback-based realization of second embodiment of the present invention, information fed back to the encoder from one or more of the receiving terminals 22, such as the packet and/or frame arrival status, is used to adjust the corresponding distortion map in the encoder for the respective one or more of the receiving terminals 22, and thereby improve the overall rate-distortion performance compared to the method by Zhang et al.

The error propagation distortion map $D_{ep}$ for each frame or slice of a frame is stored in association with that frame or slice in the decoded picture buffer 65 of the encoder, in relation to each of the receiving terminals 22. For each frame or slice, the decoded picture buffer 65 at the encoder also stores the corresponding error concealment reconstruction distortion map $D_{ec\text{-}rec}$, error concealment error propagation map $D_{ec\text{-}ep}$, corresponding mode decisions o and motion vector information. If feedback information is received from the decoder of one or more of the receiving terminals, this can then be used by the encoder to update the corresponding distortion map(s) for the respective one or more channels. Any distortion maps that are updated based on the feedback are input into the equation for the aggregate error-propagation distortion in the same way as any that aren't. Refer again to equations (3) and (4a). The feedback information allows the estimated distortion tracking to be refined, yielding better rate-distortion performance.

Preferably the update of the error distortion map for any given receiver 22 is achieved as follows. If the encoder receives feedback information signaling that a particular frame or slice has successfully arrived at the decoder, the error concealment contributions $D_{ec\text{-}rec}$ and $D_{ec\text{-}ep}$ can be removed from the error propagation distortion map $D_{ep}$ in equation (3). Conversely, if feedback information is received signaling that a particular frame or slice was lost at the decoder, the associated error propagation distortion map $D_{ep}$ is recomputed so as to only include the contributions from the error concealment distortion, i.e. the second and third term in the right hand side of equation (3), $D_{ec\text{-}rec}$ and $D_{ec\text{-}ep}$ (normalized by the a priori loss probability estimate p).

Then, if the round trip time (RTT) is small in comparison to the number of reference pictures in the decoded picture buffer, it is possible to propagate the adjusted potential error-propagation map $D_{ep}$ at time n-RTT to the error propagation distortion map at time n-1 by applying equation (3) recursively. The updated error propagation distortion map $D_{ep}$ at time n-1 will then be the basis for the computation of the $D_{ep\_ref}$ at time n which is used in the mode selection process (2). This results in a more accurate tracking of the potential distortion maps, and thus, improves the overall rate-distortion performance of the system.

Figure 4A:
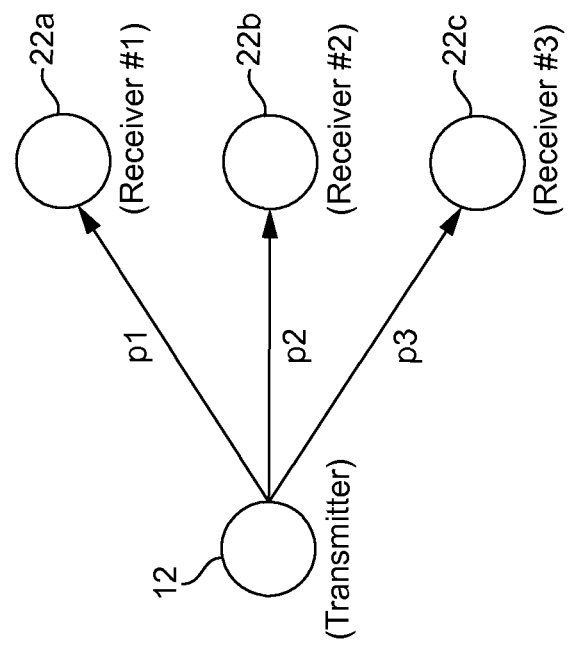

The above has been described in relation to the preferred application of FIG. 4b, but FIG. 4a illustrates an arrangement in accordance with an alternative application of the present invention, in which a transmitting terminal 30 transmits a respective instance of the same encoded version of the video stream to each of the receivers 22 via a respective connection over a packet-based network 32 such as the Internet. In this case each channel comprises the respective connection established between the transmitter 12 and respective receiver 22. Even in this scenario, it may still place an additional burden on the transmitter's CPU resources to perform a full loss-adaptive rate-distortion optimisation process in relation to each channel. Therefore it may still be desirable to aggregate the rate-distortion optimisation process in order to transmit multiple instances of a single encoded version of the video stream to the multiple receivers, thus saving on processing resources at the transmitter, if not on uplink.

To apply the above embodiments of the invention to this scenario, the probability of packet loss for the $l^{th}$ channel in equations (3a) and (3b) reduces to just the probability $p_l$ of loss over the respective connection between the transmitter 12 and respective receiver 22, and the same techniques can then be applied.

The encoder on the transmitter 12 of FIG. 4a can then transmit a respective instance of the same encoded version of the video stream to each of the receiving terminals 12, again containing the same mode selections for a given macroblock arrived at based on the same rate-distortion optimisation calculation. This saves on CPU resources at the transmitter.

It will be appreciated that the above embodiments have been described only by way of example.

Generally, while the above has been described in terms of slices, macroblocks and blocks or sub-blocks, these terms are not necessarily intended to be limiting and the ideas described herein are not limited to any particular way of dividing or subdividing a frame. Further, the distortion map may cover a whole frame or a region within a frame, and coding decision process may be applied over the whole frame or only for a region within a frame. Note also that the prediction block granularities do not have to be the same as or even connected to the distortion map granularity (though that possibility is not excluded).

The sum of squared differences (SSD) is often preferred as measure of difference since it results in higher quality compared to sum of absolute differences (SAD), but the latter possibility or other possibilities are not excluded and generally the invention could be implemented using any measure of difference between samples as a basis for quantifying distortion.

Commonly, the measure of rate also accounts for coding of all needed parameters, including parameters describing prediction and quantized transform coefficients. This kind of optimization may be referred to herein as full rate-distortion optimization (RDO). In lower complexity embodiments however, the distortion and/or rate term may be approximated by only taking into account the effect of some but not all processing stages, e.g. only taking into account the effect of prediction.

Further, where the present invention is described in terms of two frames n-1 and n, or n and n+1 or such like, according to certain embodiments of the invention it is not necessary for these to refer to two adjacent frames (though that may be the case in existing codecs). In some embodiments it is possible that inter prediction could be performed relative to an even earlier frame, and as such n-1 and n, or n and n+1, may be used in relation to the present invention to refer respectively to any previously encoded frame or image portion and a subsequent frame or portion to be predicted from it.

Note again that where a contribution due to loss is mentioned in this application, or anything stating what happens "if" data lost over the channel or such like, this only relates to a probabilistic assumption (e.g. p) made by the encoder about what might be experienced by the decoder— the encoder of course does not know what will happen. The probabilistic assumption may be predetermined at the design stage based on statistical network modelling, and/or could even be determined dynamically based on feedback from the decoder.

It should be understood that the block, flow, and network diagrams may include more or fewer elements, be arranged differently, or be represented differently. It should be understood that implementation may dictate the block, flow, and network diagrams and the number of block, flow, and network diagrams illustrating the execution of embodiments of the invention.

It should be understood that elements of the block, flow, and network diagrams described above may be implemented in software, hardware, or firmware. In addition, the elements of the block, flow, and network diagrams described above may be combined or divided in any manner in software, hardware, or firmware. If implemented in software, the software may be written in any language that can support the embodiments disclosed herein. The software may be stored on any form of non-transitory computer readable medium, such as random access memory (RAM), read only memory (ROM), compact disk read only memory (CD-ROM), flash memory, hard drive, and so forth. In operation, a general purpose or application specific processor loads and executes the software in a manner well understood in the art.

Other variants may become apparent to a person skilled in the art given the disclosure herein. The scope of the invention is not limited by the described embodiments but only by the appendant claims.

What is claimed is:

1. A method of encoding a video stream, the method comprising:
   clustering channels from a transmitting terminal to a plurality of receiving terminals into classes, the channels in each class having similar packet loss probabilities between the transmitting terminal and the receiving terminals of the class, and each class having an associated error propagation distortion map;
   determining an estimate of error propagation distortion for each of the classes of channels, the estimate of distortion being determined from the respective error propagation distortion map associated with each of the classes;
   performing a rate-distortion optimization process comprising, for each of a plurality of target image portions to be encoded in a frame of the video stream, selecting a preferred one of a set of encoding modes by optimizing a function comprising an estimate of distortion for the target image portion and a measure of bit rate required to encode the target image portion, the estimate of distortion being based on source coding distortion and the estimates of error propagation distortion for the classes;
   encoding the target image portions into an encoded version of the video stream using the selected encoding modes; and
   transmitting the same encoded version of the video stream from the transmitting terminal to each of the plurality of receiving terminals over respective channels, using the same rate-distortion optimization process in relation to each of the plurality of receiving terminals, the use of the same rate-distortion optimization process comprising making the same encoding mode selection per target image portion based on the same optimization of said function.

2. The method of claim 1, wherein two or more of said channels are via a common relay node, whereby the transmitting terminal transmits the encoded version of the video stream to the relay mode over a first leg, and the relay node forwards a respective instance of the encoded version of the video stream on to each of the respective two or more receiving terminals via a respective second leg of the channel.

3. The method of claim 2, comprising determining an individual probability of loss over each of said channels, and determining an aggregate probability based on the individual probabilities, wherein the aggregate estimate of distortion is based on the aggregate probability, and wherein the individual probability for each of said two or more channels is determined by combining probabilities of loss over each of its legs.

4. The method of claim 3, wherein the relay node comprises one of a server and an end-user terminal.

5. The method of claim 1, wherein the packet loss probability of each class comprises one of a maximum, a median and a mean of individual packet loss probabilities of the channels in each class.

6. The method of claim 1, comprising determining an individual estimate of error propagation distortion that would be experienced due to possible loss over each of said channels, wherein the determined estimate of error propagation distortion for each class is an aggregate estimate of error propagation distortion determined by aggregating the individual estimates of error propagation distortion.

7. The method of claim 1, comprising updating the error propagation maps after each encoding mode selection.

8. The method of claim 6, wherein the aggregate of the individual estimates of distortion comprises one of a maximum, a median and a mean of the individual estimates of distortion.

9. The method of claim 6, wherein the individual estimate of error propagation distortion for each of one or more of said channels is based on feedback from the respective receiving terminal.

10. The method of claim 9, wherein said feedback comprises one of an acknowledgement that at least part of said earlier frame has been received, and a report that at least part of said earlier frame has not been received.

11. The method of claim 6, wherein the individual estimate of error propagation distortion based on feedback comprises: adjusting the estimate of distortion for an earlier frame or part of the earlier frame in dependence on said feedback, and propagating the adjusted estimate of distortion forward for use in relation to a current frame.

12. The method of claim 10, wherein the individual estimate of error propagation distortion based on feedback comprises:
   adjusting the estimate of distortion for an earlier frame or part of the earlier frame in dependence on said feedback; and
   propagating the adjusted estimate of distortion forward for use in relation to a current frame; and
   the individual estimate of error propagation distortion based on feedback comprises:
   adjusting the estimate of distortion for the earlier frame or part of the earlier frame in dependence on at least one of said acknowledgment and said report; and
   propagating the adjusted estimate of distortion forward for use in relation to the current frame.

13. The method of claim 1, wherein the encoding modes comprise at least an intra frame mode which encodes the target image portion relative to a reference image portion in the same frame, and an inter frame encoding mode which encodes the target image portion relative to a reference image portion in a previously encoded frame.

14. The method of claim 1, wherein the set of encoding modes comprises a skip mode.

15. The method of claim 1, wherein the set of encoding modes comprises modes using different partitions of the target image portion for at least one of intra and inter frame encoding.

16. A transmitting terminal for encoding a video stream, the transmitting terminal comprising:
an encoder configured to:
cluster channels from the transmitting terminal to a plurality of receiving terminals into classes, the channels in each class having similar packet loss probabilities between the transmitting terminal and the receiving terminals of the class, and each class having an associated error propagation distortion map;
determine an estimate of error propagation distortion for each of the classes of channels, the estimate of distortion being determined from the respective error propagation distortion map associated with each of the classes; and
perform a rate-distortion optimization process comprising, for each of a plurality of target image portions to be encoded in a frame of the video stream, selecting a preferred one of a set of encoding modes by optimizing a function comprising an estimate of distortion for the target image portion and a measure of bit rate required to encode the target image portion, the estimate of distortion being based on source coding distortion and the estimates of error propagation distortion for the classes, the encoder being arranged to encode the target image portions into an encoded version of the video stream using the selected encoding modes; and
a transmitter configured to transmit the same encoded version of the video stream from the transmitting terminal to each of the plurality of receiving terminals over respective channels, the encoder being configured to use the same rate-distortion optimization process in relation to each of the plurality of receiving terminals, the use of the same rate-distortion optimization process comprising making the same encoding mode selection per target image portion based on the same optimization of said function.

17. The transmitting terminal of claim 16, wherein two or more of said channels are via a common relay node, whereby the transmitter is configured to transmit the encoded version of the video stream to the relay mode over a first leg, such that the relay node forwards a respective instance of the encoded version of the video stream on to each of the respective two or more receiving terminals via a respective second leg of the channel.

18. The transmitting terminal of claim 17, wherein the encoder is configured to determine an individual probability of loss over each of said channels, and determine an aggregate probability based on the individual probabilities; and wherein the encoder is configured such that the aggregate estimate of distortion is based on the aggregate probability, and the individual probability for each of said two or more channels is determined by combining probabilities of loss over each of its legs.

19. The transmitting terminal of claim 16, wherein the encoder is configured to determine an individual estimate of error propagation distortion that would be experienced due to possible loss over each of said channels, and wherein encoder is configured such that the determined estimate of error propagation distortion for each class is an aggregate estimate of error propagation distortion determined by aggregating the individual estimates of error propagation distortion.

20. The transmitting terminal of claim 19, wherein the encoder is configured to update the error propagation map after each encoding mode selection.

21. A computer program product for encoding a video stream, the computer program product being embodied on a computer-readable storage memory device and comprising code configured so as when executed on a transmitting terminal to perform operations of:
clustering channels from a transmitting terminal to a plurality of receiving terminals into classes, the channels in each class having similar packet loss probabilities between the transmitting terminal and the receiving terminals of the class, and each class having an associated error propagation distortion map;
determining an estimate of error propagation distortion for each of the classes of channels, the estimate of distortion being determined from the respective error propagation distortion map associated with each of the classes;
performing a rate-distortion optimization process comprising, for each of a plurality of target image portions to be encoded in a frame of the video stream, selecting a preferred one of a set of encoding modes by optimizing a function comprising an estimate of distortion for the target image portion and a measure of bit rate required to encode the target image portion, the estimate of distortion being based on source coding distortion and the estimates of error propagation distortion for the classes;
encoding the target image portions into an encoded version of the video stream using the selected encoding modes; and
transmitting the same encoded version of the video stream from the transmitting terminal to each of the plurality of receiving terminals over respective channels, using the same rate-distortion optimization process in relation to each of the plurality of receiving terminals, the use of the same rate-distortion optimization process comprising making the same encoding mode selection per target image portion based on the same optimization of said function.

22. The computer program product of claim 21, wherein two or more of said channels are via a common multicasting relay node, whereby the code is configured so as when executed on the transmitting terminal to transmit the encoded version of the video stream to the multicasting relay mode over a first leg, such that the multicasting relay node forwards a respective instance of the encoded version of the video stream on to each of the respective two or more receiving terminals via a respective second leg of the channel.

23. The computer program product of claim 22, wherein the code is configured so as when executed to determine an individual probability of loss over each of said channels, and determine an aggregate probability based on the individual probabilities; and wherein the code is configured such that the aggregate estimate of distortion is based on the aggregate probability, and the individual probability for each of said two or more channels is determined by combining probabilities of loss over each of its legs.

24. The computer program product of claim 21, wherein the code is configured so as when executed to determine an individual estimate of error propagation distortion that would be experienced due to possible loss over each of said channels, and wherein the code is configured such that the determined estimate of error propagation distortion for each class is an aggregate estimate of error propagation distortion determined by aggregating the individual estimates of error propagation distortion.

25. The computer program product of claim 24, wherein the code is configured is configured so as when executed to update the error propagation maps after each encoding mode selection.

26. The computer program product of claim 21, wherein the packet loss probability of each class comprises one of a maximum, a median and a mean of individual packet loss probabilities of the channels in each class.

27. The computer program product of claim 24, wherein the aggregate of the individual estimates of distortion comprises one of a maximum, a median and a mean of the individual estimates of distortion.

28. The transmitting terminal of claim 16, wherein packet loss probability of each class comprises one of a maximum, a median and a mean of individual packet loss probabilities of the channels in each class.

* * * * *